(12) United States Patent
Thorsén et al.

(10) Patent No.: US 11,516,695 B2
(45) Date of Patent: Nov. 29, 2022

(54) LINK AGGREGATION WITH DATA SEGMENT FRAGMENTATION

(71) Applicant: Telefonaktiebolaget LM Ericsson (publ), Stockholm (SE)

(72) Inventors: Per-Arne Thorsén, Öjersjö (SE); Pierre Hygren, Sjömarken (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 33 days.

(21) Appl. No.: 16/964,138

(22) PCT Filed: Jan. 24, 2019

(86) PCT No.: PCT/EP2019/051686
§ 371 (c)(1),
(2) Date: Jul. 22, 2020

(87) PCT Pub. No.: WO2019/149603
PCT Pub. Date: Aug. 8, 2019

(65) Prior Publication Data
US 2021/0037409 A1    Feb. 4, 2021

(30) Foreign Application Priority Data

Jan. 31, 2018  (WO) ................. PCT/EP2018/052394
Jan. 31, 2018  (WO) ................. PCT/EP2018/052399

(51) Int. Cl.
*H04W 28/02*   (2009.01)
*H04L 45/00*   (2022.01)
(Continued)

(52) U.S. Cl.
CPC ......... *H04W 28/0252* (2013.01); *H04L 45/22* (2013.01); *H04L 45/74* (2013.01);
(Continued)

(58) Field of Classification Search
CPC . H04L 41/0663; H04L 41/0896; H04L 45/22; H04L 45/245; H04L 45/74;
(Continued)

(56) References Cited

U.S. PATENT DOCUMENTS 6,615,383 B1   9/2003  Talluri et al.
7,894,481 B2   2/2011  van Greunen et al.
(Continued)

FOREIGN PATENT DOCUMENTS

WO   2019149349 A1   8/2019
WO   2019149351 A1   8/2019

OTHER PUBLICATIONS

International Search Report and Written Opinion of the International Searching Authority for PCT International Application No. PCT/EP2019/051686 dated Jul. 1, 2019.

*Primary Examiner* — Pao Sinkantarakorn
(74) *Attorney, Agent, or Firm* — Sage Patent Group

(57) ABSTRACT

A method for link aggregation of a plurality of communication links, performed in a communication arrangement, the method comprising;
obtaining a data segment to be transmitted,
identifying a preferred communication link out of the plurality of communication links for transmission of the data segment, and, if the preferred communication link is not available for transmission of the data segment within a current time period,
identifying an alternative communication link out of the plurality of communication links different from the preferred communication link,
fragmenting the data segment into at least a first fragment and a second fragment,
attaching a fragment header to each of the first and second fragments, each fragment header being configured to identify the respective fragment as a fragment belonging to a data segment, and (Continued)

transmitting the first fragment over the alternative communication link.

15 Claims, 16 Drawing Sheets

(51) Int. Cl.
  *H04L 45/74* (2022.01)
  *H04L 47/34* (2022.01)
  *H04W 40/02* (2009.01)
  *H04W 28/06* (2009.01)
(52) U.S. Cl.
  CPC ......... *H04L 47/34* (2013.01); *H04W 28/0289* (2013.01); *H04W 28/065* (2013.01); *H04W 40/02* (2013.01)
(58) Field of Classification Search
  CPC .. H04L 47/125; H04L 47/34; H04W 28/0252; H04W 28/0289; H04W 28/065
  See application file for complete search history.

(56) References Cited

U.S. PATENT DOCUMENTS

| | | | |
|---|---|---|---|
| 7,924,798 B1 | 4/2011 | Brown et al. | |
| 2014/0126511 A1* | 5/2014 | Okazaki | H04L 1/0026 370/329 |
| 2017/0111264 A1* | 4/2017 | Shankarappa | H04L 47/41 |
| 2017/0311204 A1* | 10/2017 | Cariou | H04W 28/0263 |
| 2018/0019942 A1* | 1/2018 | Liang | H04L 47/41 |

\* cited by examiner

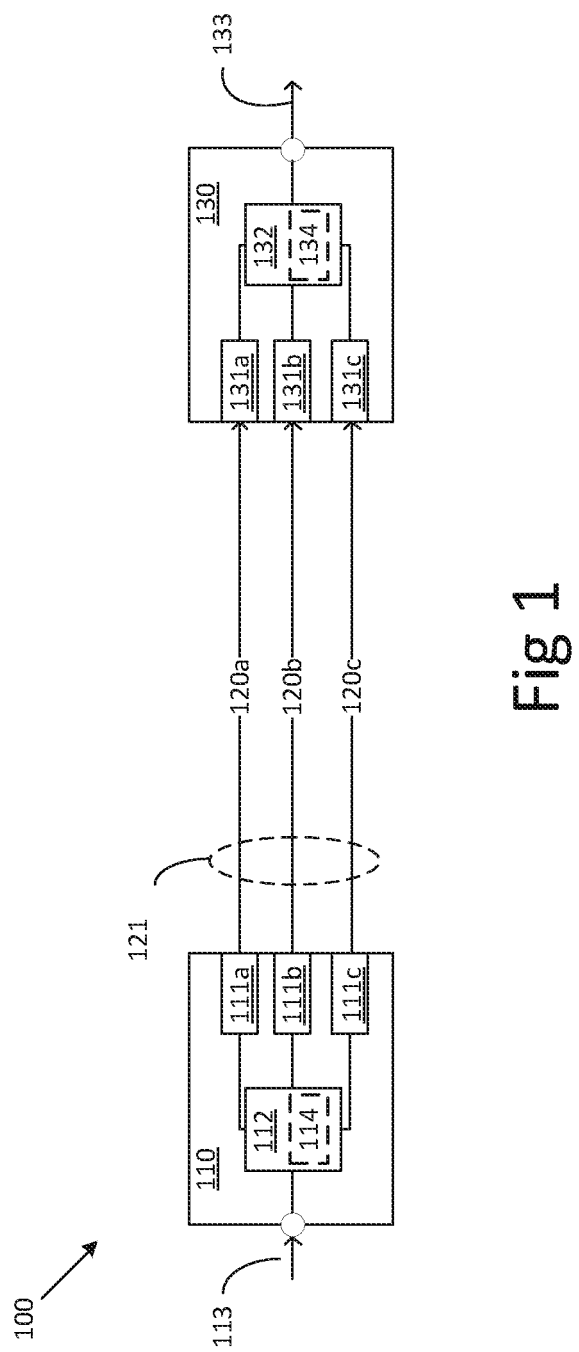

LINK AGGREGATION WITH DATA SEGMENT FRAGMENTATION

CROSS REFERENCE TO RELATED APPLICATIONS

This application is a 35 U.S.C. § 371 national stage application of PCT International Application No. PCT/EP2019/051686 filed on Jan. 24, 2019, which itself is a continuation of PCT International Application No. PCT/EP2018/052394, filed Jan. 31, 2018 and PCT International Application No. PCT/EP2018/052399, filed Jan. 31, 2018, the disclosures and contents of which are incorporated by reference herein in their entireties.

TECHNICAL FIELD

The present disclosure relates to link aggregation of a plurality of communication links, performed in a transmitter communication arrangement and a receiver communication arrangement which together form a communication system. The data communication links may comprise wireline or wireless data communication links.

BACKGROUND

For communication links, it is known to aggregate two or more links to increase capacity of data transmission. Several ways exist to aggregate links to increase data bandwidth between two points in a network.

One way to do this is Communication link Bonding, or Radio Link Bonding (RLB) which refers to layer one (L1) schemes and is agnostic to layer two (L2) and higher protocol layers. Bonding means that different parts of the traffic are conveyed over different links and reassembled when received. If the links have different rates, the delays are different, implying buffering and/or delay equalization before reassembly when waiting for the subsequent parts of data to arrive over slower links. The link speed may also change arbitrarily between links due to, e.g., different susceptibility to external conditions for different carrier frequencies. Buffering is therefore often centralized and need to be dimensioned for a worst-case scenario. These schemes can be made very effective when it comes to making best use of the available spectrum resources.

An example L1 bonding scheme is Segment Bonding by which data is divided into equal sized segments that are distributed between physical links based on link availability. This is a pure L1 approach. Since the distribution method is agnostic to network end points, buffering and strict order between segments must be preserved during reassembly. The main advantage with this method is that it is possible to reach a very high utilization of the physical links. The main disadvantage is that latency between any endpoints is set by segment latency over the slowest physical link.

L1 bonding works well from a spectrum efficiency stand point and can also handle varying link bandwidth well, but it suffers partly from complexity problems since forwarding of fragments over several links according to L1 bonding requires strict control over delivery order. Since a strict order of all data segments irrespective of flow identity is preserved, there will of course not be any reordering of data segments. Nevertheless, when many links of different bandwidth are aggregated, and since the status of each link must be known and accounted for, the buffering and reassembly schemes may grow in complexity.

There are also L2 and layer three (L3) link aggregation methods. A known such method is the IEEE 802.3ad Link Aggregation (LAG) standard, IEEE Std 802.1AX-2008 and Equal Cost Multipath (ECMP), RFC2991, where link/route allocation is performed based on flow identification assigned via higher protocol layer address fields.

L2/L3 schemes are in comparison to L1 schemes less complicated to implement. Basically, a flow is identified by, e.g., its hash checksum value, often calculated from static address fields. The flow is then assigned to a physical link in an aggregation group (AG). Subsequent data segments with the same hash checksum value are thereafter forwarded to the link originally assigned. This results in that each certain flow only is forwarded by means of one specific corresponding link, which in turn results in that data segment order within flows is preserved. There are several problems associated with this approach, e.g.;

Statistical bias; This could be that the hashing algorithm interferes with address assignment rules in the network thus causing a systematic preference for one link.

Variation width problems when there are few flows; Even without any systematic errors, there is a high possibility of biased outcomes. When assuming 20 flows and "perfect conditions", average possible utilization of the aggregated capacity is as low as 86% with a 25% risk of being as low as 77%.

QoS impact on individual overprovisioned links; I.e. biased link assignment (or temporary congestion on a single link even if distribution otherwise balanced) may lead to unintended data segment drops, i.e. you can drop data segments even when there is capacity available, making the QoS system not really work in a good way.

Consequently, there is a need for improved link aggregation methods.

SUMMARY

It is an object of the present disclosure to provide communication arrangements and methods for improved link aggregation.

This object is obtained at least in part by a method for link aggregation of a plurality of communication links, performed in a communication arrangement. The method comprises obtaining a data segment to be transmitted and identifying a preferred communication link out of the plurality of communication links for transmission of the data segment. If the preferred communication link is not available for transmission of the data segment within a current time period, the method identifies an alternative communication link out of the plurality of communication links different from the preferred communication link, fragments the data segment into at least a first fragment and a second fragment, and attaches a fragment header to each of the first and second fragments, each fragment header is configured to identify the respective fragment as a fragment belonging to the data segment. The first fragment is then transmitted over the alternative communication link.

This solution prevents unnecessary latency when frames or data packets in a connection between two endpoints temporarily moves from a preferred communication link to an alternative communication link with, e.g., lower capacity or lower transmission rate. By the disclosed method, a packet or segment is first fragmented and then successively transferred away from the preferred link. This means that part of the packet may be transferred back to the preferred link if the preferred communication link becomes available again before all fragments of the packet have been transmitted over the alternative communication link.

According to aspects, the fragment headers comprise sequence numbers from a sequence associated with a flow in which the data segment is comprised.

This way the re-assembly procedure for the parent flow of packets or data segments need not be changed, since the same sequence numbering is used for the fragments as for the data units in the flow, which is an advantage. The receive side processing is simplified, since there is no difference, from a re-ordering point of view, between fragments and data segments.

According to some aspects, the identifying comprises identifying a plurality of alternative communication links out of the plurality of communication links and fragmenting the data segment into fragments for transmission over at least part of the plurality of alternative communication links.

By allowing for transmission of fragments over a plurality of alternative communication links, increased robustness is obtained, and also an increased rate of transmission when moving away from the preferred communication link. It is an advantage that the proposed method can be generalized to operate using a plurality of alternative communication links.

Yet an advantage of the proposed methods is that the fragments of the frames or data packets in many aspects can be processed and handled in the same way as frames or data packets generally are processed and handled, whereby applying the proposed methods has limited impact on other operations of the transmitter communication arrangement.

Further aspects and advantages associated with the disclosed methods will be discussed in detail below.

The disclosed methods are applicable with both receive side buffering and transmit side buffering link aggregation schemes, which is an advantage.

Consequently, according to some aspects, the method comprises obtaining data segments to be transmitted and identifying one or more data flows in the obtained data segments. The method then comprises attaching sequence numbers (SEQ) to data segments associated with each identified data flow, wherein sequence numbers are independent between data flows. The method also comprises determining a subset of available communication links out of the plurality of communication links, which subset of available communication links are available for transmission of a data segment within a current time period and selecting a communication link from the subset of available communication links for transmission of a data segment associated with a certain data flow. Notably, the selecting comprises selecting a previous communication link that has been used for transmission of a previous data segment from said certain data flow in case said previous communication link is comprised in the subset of available communication links and selecting any communication link comprised in the subset of available communication links otherwise.

This represents one example of how receive side buffering can be used with the new techniques disclosed herein.

According to some other aspects, the method comprises obtaining data segments to be transmitted and determining a risk of re-ordering of data segments within a certain data flow comprising a certain data segment, where said risk is associated with transmitting said certain data segment via a certain communication link out of the plurality of communication links, based on link characteristics associated with the communication links. The method also comprises buffering said certain data segment until the risk of re-ordering satisfies a predetermined criterion, prior to transmitting the said certain data segment via the selected communication link.

This represents one example of how transmit side buffering can be used with the new techniques disclosed herein.

There is also disclosed herein receive methods for link aggregation of a plurality of communication links corresponding to the transmit methods. The receive methods are performed in a communication arrangement, and comprises;

receiving data via the plurality of communication links, detecting fragment headers associated with fragments in the received data, re-assembling fragments corresponding to respective data segments, and forwarding re-assembled data segments on a port of the communication arrangement.

The receive method works with previously proposed receive side buffering methods, which is an advantage. For instance, the disclosed methods are applicable with a method for link aggregation of a plurality of communication links, performed in a communication arrangement. The method comprising receiving data segments via the plurality of communication links, identifying one or more data flows in the received data segments, extracting sequence numbers attached to received data segments, wherein the sequence numbers are arranged to be independent between data flows, detecting data segments received out of sequence, by means of the extracted sequence numbers, wherein the sequence numbers indicate an in-sequence order of data segments, buffering data segments detected as received out of sequence, and forwarding data segments according to sequence number order on a port of the communication arrangement.

There are also disclosed herein computer programs, computer program products, traffic handling units, communication arrangements, and communication systems associated with the above mentioned advantages.

BRIEF DESCRIPTION OF THE DRAWINGS

The present disclosure will now be described in more detail with reference to the appended drawings, where FIG. 1 shows a schematic view of a communication system arranged for link aggregation;

DETAILED DESCRIPTION

Figure 2A:
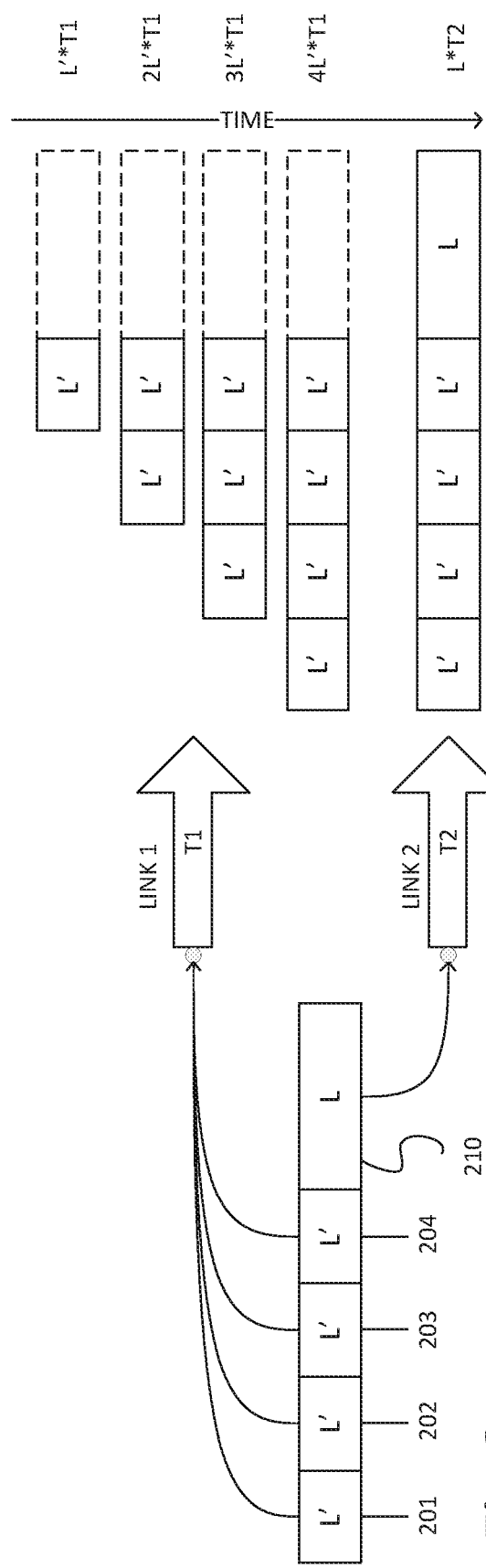
FIGS. 2a-2b illustrate link aggregation scenarios.

Aspects of the present disclosure will now be described more fully with reference to the accompanying drawings. The different devices, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Herein, a communication link can be said to be associated with a congestion state. Congestion in data networking and queueing theory refers to the reduced quality of service that occurs when a network node or link is carrying more data than it can handle. Typical effects include queueing delay, packet loss or the blocking of new connections. A consequence of congestion is that an incremental increase in offered load leads either only to a small increase or even a decrease in network throughput. A communication link that is in a congestion state, or is entering a congestion state regularly, is said to be associated with a congestion condition. Information about when a given link is associated with a congestion state can be obtained via delay measurement, or reports from a buffering module, a queuing module, or the like.

A communication link is associated with a transmission rate. A transmission rate of a communication link can be measured in terms of, e.g., information bits/sec (bps), or packets per sec. The transmission rate may be an information transmission rate payload transmission rate which does not include overhead such as headers and address fields, or it can be a raw transmission rate which includes all data transmitted over the communication link.

A communication link is also associated with a transmission capacity, which indicates an amount of data that can be transferred over the link. An operator may have invested in equipment and spectrum assets to establish a point to point connection for mobile backhaul. When aggregating channels using that equipment, the aggregated capacity shall preferably be as close as possible to the sum of the capacities from the individual channels. When using, e.g. LAG, that is not the case, and data can be discarded in the QoS domain even if there is capacity available on one of the links.

A communication link is also often associated with a transmission cost. The transmission cost can be determined, e.g., in terms of energy expenditure, monetary cost, equipment cost, or the like. An operator may be interested in reducing transmission costs, which may influence a choice between two or more communication links. For instance, a given high transmission rate link may be associated with an expensive lease contract, which make it undesirable to use except for in cases where other less costly links are in congested states or otherwise not available.

It is thus appreciated that a 'preferred link' can be preferred for many different reasons beyond transmission rate.

A wireline link may be an Ethernet cable, or an optical fiber link for use in a trunking network or the like.

A wireless link may be a microwave point to point link used in a backhauling application, or it can be an in-band backhauling wireless link in a cellular access network.

Herein, a flow or data flow is a coherent and consecutive flow of data segments. A data flow can according to some aspects correspond to a user streaming a film, a user sending an e-mail or a user having a telephone conversation.

A data segment is a unit of data, such as a data frame or a data packet.

With reference to FIG. 1, a schematic view of a wireless communication arrangement 100 is shown. The wireless communication arrangement 100 comprises a first communication arrangement 110 and a second communication arrangement 130 which are adapted to communicate with each other via a plurality of communication links 120a, 120b, 120c. For this purpose, the first communication arrangement 110 comprises a corresponding communication link interface 111a, 111b, 111c for each communication link 120a, 120b, 120c, and the second communication arrangement 130 comprises a corresponding communication link interface 131a, 131b, 131c for each communication link 120a, 120b, 120c. The communication links may, as noted above, comprise both wireline and wireless links.

Furthermore, the first communication arrangement 110 comprises a first traffic handling unit 112, and the second communication arrangement 130 comprises a second traffic handling unit 132, where each traffic handling unit 112, 132 is adapted to control the communication by routing communication signals that comprise digital data streams.

The communication links 120a, 120b, 120c are comprised in an Aggregation Group (AG) 121 and provide an aggregated capacity for forwarding data segments from one bridge or router port. This means that only one Common QoS domain is handled and that sub-optimal dropping cannot occur.

In the following, communication from the first communication arrangement 110 to the second communication arrangement 130 will be described, but according to some aspects, the communication arrangements 110, 130 work reciprocally.

Link aggregation can be performed in a number of different ways, as was discussed above. Advantageously, link aggregation is performed in an adaptive manner, such that flows of data segments are transferred between the different communication links 120a, 120b, 120c, depending on, e.g., congestion state or transmission cost. When the aggregated links have different transmission rates and/or latency, such adaptive link aggregation preferably includes delay equalization. This can be performed using buffering at the receive side or buffering at the transmit side. Examples of both receive side buffering link aggregation and transmit side buffering link aggregation schemes will be discussed in detail below.

The link aggregation methods described below demonstrate how data frames can be endpoint aware distributed semi-dynamically, combined with buffering schemes preserving the order of frames between end points. These methods offer high link utilization, short latency and low complexity reassembly and collection. One potential problem with these methods though, is that latency for full length frames distributed over a slow link could be longer than with, e.g., Segment Bonding L1 schemes.

When physical links of different capacity are aggregated, the time it takes to transport a frame or data segment of a certain length, depends on which physical link it is transported over. The methods using receive side buffering and transmit side buffering discussed below show how characterizing frames according to the endpoints they establish connections between (a.k.a. Flows), and then basing link distribution on that, can contribute to low latency and high utilization of the physical links.

Both the receive side buffering link aggregation and the transmit side buffering link aggregation methods discussed below include dynamic reallocation of frames within flows to physical links with available capacity. This means that temporarily, in congested situations, a long frame may be distributed to a slow link while subsequent short frames of the same flow are distributed to a fast link. When this happens, reordering will take place over the full length of the frame distributed to the slow link.

A proposed solution to this problem is to introduce an adaptive segmentation scheme, which is described here.

If a fast (in terms of transmission rate) physical link is preferred for a certain flow, and that flow is temporarily moved to a slower link, frames are fragmented, and distribution can be done of shorter segments containing such fragments until the flow moves back to the preferred link or a new preferred link is established. This way a long frame need not be entirely committed to a slow link, which reduces the risk of delay. Since fragmentation is not always performed, but only when there is a risk of excessive delay, both communication overhead and processing overhead is minimized.

Each fragment may be equipped with a header or tag identifying it as a fragment, and optionally also with a sequence number from the sequence number series of the parent flow. According to some aspects, fragments are tagged using the same sequence number series as their parent flow. Since sequence numbers are assigned per flow, and all fragments of a frame will be transmitted before subsequent frames of that flow, this results in that fragments constituting a frame will have strictly numerically ordered sequence numbers, which simplifies processing and reduced complexity. In the receiver buffer, segments will end up in sequence order and can easily be reassembled before forwarded to the egress port. This means that the same functionality of the collection mechanism used to handle reordering of frames, can be used to handle fragments of frames contained in segments forwarded over different links, which is an advantage.

Consequently, the proposed data segment fragmentation scheme is particularly suitable for use with the receive side buffering scheme discussed below. When used with the receive side buffering link aggregation scheme, the same sequence number series can be used for the data fragments as for the data segments, which means that the receive side just collects fragments as if they were segments. It is, however, preferred to identify the data fragments as fragments, so that no incomplete data segments are forwarded on an egress port before all fragments have been assembled into a complete data segment.

Figure 2B:
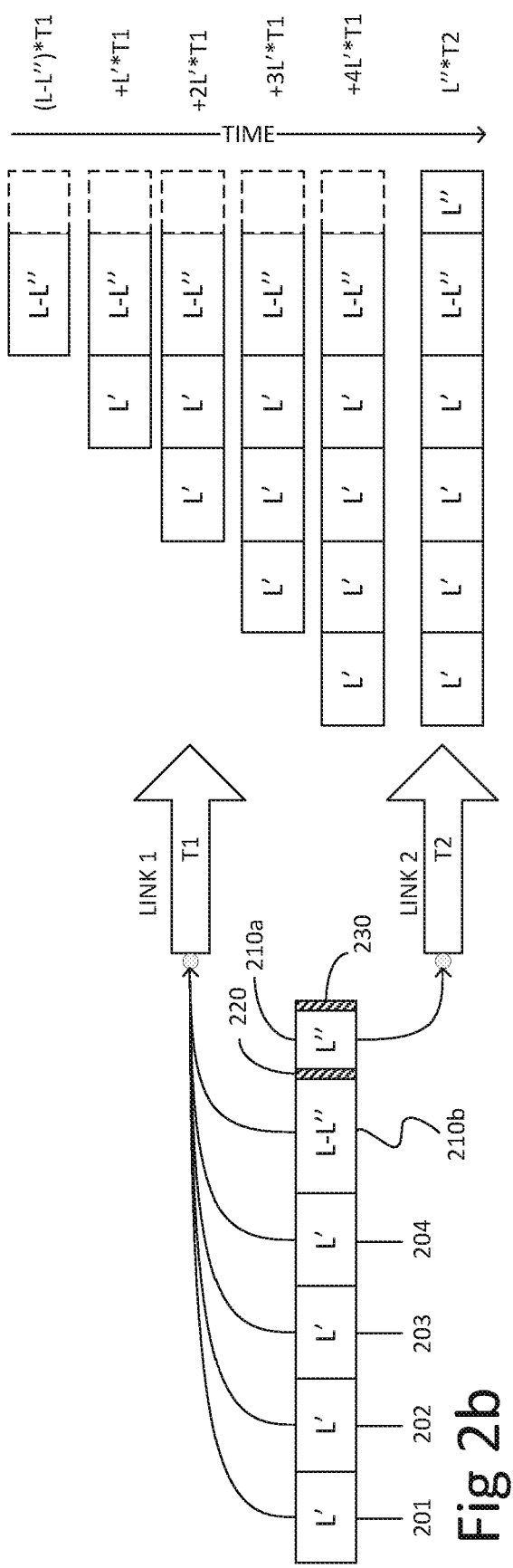

FIGS. 2a and 2b show transport of five frames 201, 202, 203, 204, 210 over two links, one fast denoted LINK1 and one slow denoted LINK 2. The first frame 210 is of length L, while the other frames 201-204 are of length L'<L.

The fast link is assumed to be congested when transport of the first frame 210 commences. Without segmentation, as illustrated in FIG. 2a, transport of the first frame 210 over the second link will take L*T2 seconds, where L is the length of the frame in, e.g., bits, and T2 is the time it takes to transport one unit of length (e.g., bit) over that link.

Immediately after the first frame is forwarded on Link 2, Link 1 becomes available again. Four shorth frames 201-204 are then forwarded on that link on a shorter time than it takes for the first frame over the slow link. The total latency is thus constrained by the transport of the frame of length L. The total time for transporting the four shorter segments over the fast link is in the example 4L'*T1. The time it takes to transport the longer data segment is L*T2.

FIG. 2b illustrates one possible outcome when the suggested method of segment fragmentation is used. The first frame is in this cased fragmented, and a first fragment 210a of length L" is forwarded over Link 2. The fast Link 1 then becomes available and a second fragment 210b of length L-L" containing the remaining part of the first data segment 210 is transported over that link. In this example the transport over Link 2 is still constraining the total latency, but since L"<L the total latency is shorter compared to the case without fragmentation illustrated in FIG. 2a. The time it takes to transport the four shorter frames over the fast link is still 4L'*T1. The total time for transporting all segments is now L"*T2.

From FIG. 2b, it can be deduced that receiving a consecutive sequence of complete frames is equivalent to receiving all segments containing fragments of the first frame. I.e. either after (L-L")*T1 or L"*T2. Since both these times are shorter than L*T2, the total latency is always shorter with fragmentation.

It is also easily realized that dividing the first frame into fragments having equal transport time over the two links provides the lowest total latency, i.e. when (L-L")*T1=L"*T2. This means the that first fragment shall preferably have the length L"=L/(1+T1/T2) or expressed in capacity L"=L/(1+C1/C2) where C1 and C2 is the capacity of links 1 and 2. The optimum length for transporting over more than two links can be similarly derived in a straight forward manner.

Figure 3:
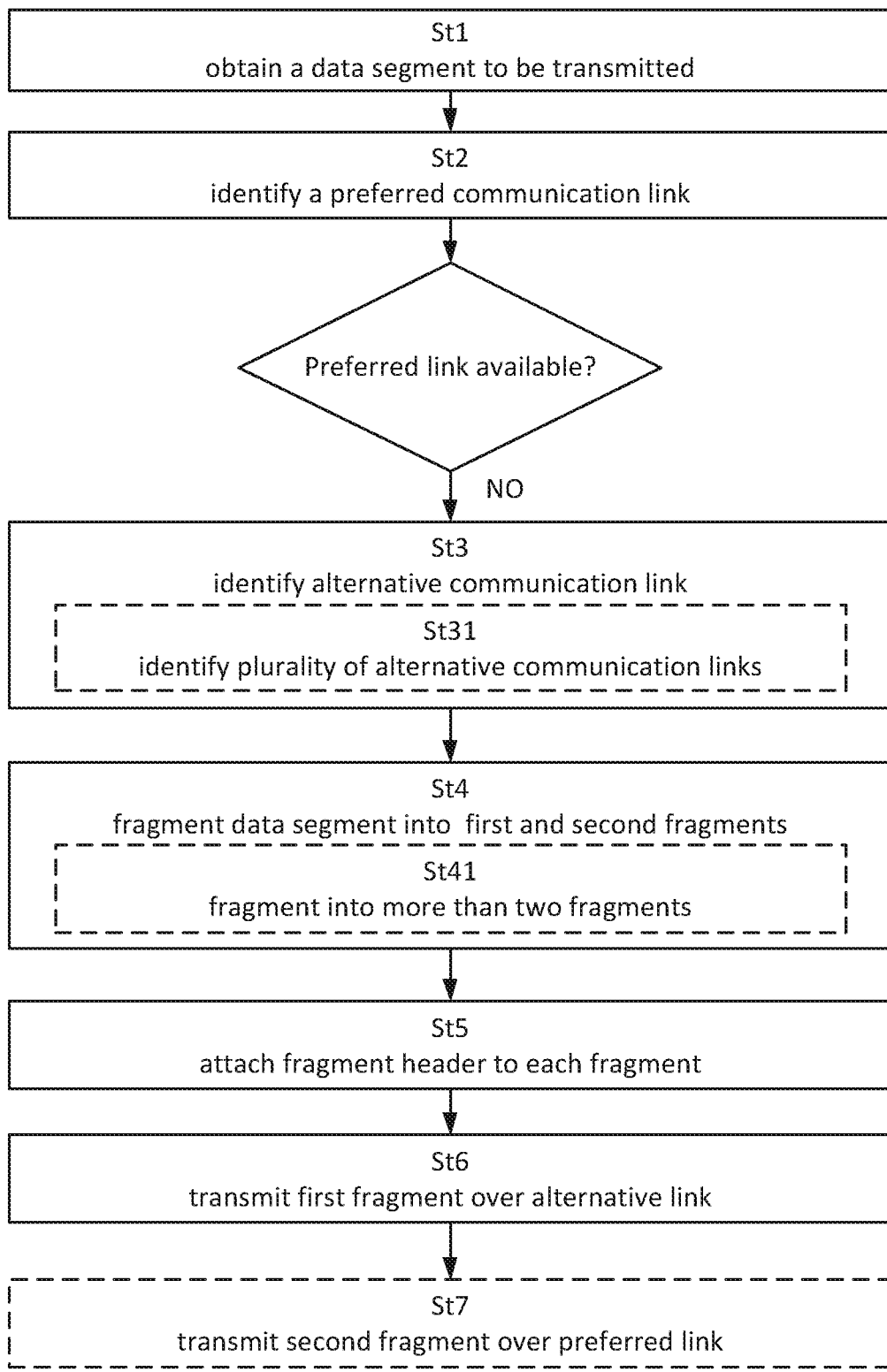
FIGS. 3-4 are flowcharts illustrating methods according to examples of the present disclosure.

FIG. 3 is a flow chart illustrating methods. There is illustrated a method for link aggregation of a plurality of communication links 120a, 120b, 120c, 120d, performed in a communication arrangement 110, 130. The method comprises obtaining St1 a data segment 210 to be transmitted and identifying St2 a preferred communication link out of the plurality of communication links 120a, 120b, 120c for transmission of the data segment. This preferred communication link was referred to as LINK 1 in the discussions in connection to FIG. 2. Some different examples of how to determine a preferred communication link will be discussed below in connection to the receive side and the transmit side buffering schemes. This preferred link may, e.g., be the link associated with the highest transmission rate or the lowest cost according to some metric. The preferred communication link may, as discussed above, not always be available for transmission, due to, e.g., being overloaded or suffering from other circumstances.

According to some aspects, the preferred communication link is associated with a transmission rate T1, and/or a transmission capacity C1, wherein the alternative communication link is associated with a transmission rate T2, and/or a transmission capacity C2, wherein T1 is higher than T2 and/or C1 is higher than C2.

If the preferred communication link is not available for transmission of the data segment within a current time period, the method comprises identifying St3 an alternative communication link out of the plurality of communication links 120a, 120b, 120c different from the preferred communication link. This alternative communication link was referred to as LINK 2 when discussing FIG. 2 above. The alternative communication link may, e.g., be associated with a lower rate compared to the preferred communication link, or it may be more unreliable in terms of, e.g., packet loss or the like. Some different examples of how to determine an alternative communication link will also be discussed below in connection to the receive side and the transmit side buffering schemes.

According to some aspects, the preferred communication link not being available for transmission of the data segment within the current time period comprises the preferred communication link being associated with a congestion condition. Congestion was discussed above. It is appreciated that congestion can be an intermittent state which comes and goes over time.

According to some other aspects, the preferred communication link not being available for transmission of the data segment within the current time period comprises the preferred communication link being associated with a traffic load condition exceeding a pre-configured high traffic load threshold.

There are known methods for determining and/or predicting when a given link is in a congestion state or is associated with high load. Such methods will therefore not be discussed in more detail here.

Once an alternative communication link has been identified, the method comprises fragmenting St4 the data segment 210 into at least a first fragment 210a and a second fragment 210b, and attaching St5 a fragment header 220, 230 to each of the first and second fragments, where each fragment header is configured to identify the respective fragment as a fragment belonging to a data segment. This means that the entire data segment 210 is not committed to the alternative link, rather, only a shorter fragment of the segment 210 is committed to the alternative link. If the preferred link again becomes available, then the remainder of the segment 210 can be transmitted over the preferred link. This is an advantage since overall transmission latency is reduced.

The method also comprises transmitting St6 the first fragment 210a over the alternative communication link. It is appreciated that the step of transmitting may comprise triggering transmission by some other entity, or actually transmitting the first fragment via some interface.

According to some aspects, the fragment headers 220, 230 comprise sequence numbers from a sequence associated with a flow in which the data segment is comprised. These types of aspects are especially suited for receive side buffering, since the same re-ordering process can be used for the data segments as for the fragments. For example, suppose segments 1, 2, and 3 are transmitted over the preferred link, which then gets congested. The segment which would have been segment 4, had it been transmitted over the preferred link, now gets fragmented. The first such fragment is tagged by sequence number 4. Suppose now that the preferred link immediately becomes available again. The remainder of the fragmented segments is then tagged by sequence number 5 and transmitted over the preferred link. The receive side re-ordering process only needs to re-order segments and fragments according to sequence number, independently of if a fragment or a segment is received.

According to aspects, with reference to FIG. 2, a length L" of the first fragment is determined as L"=L/(1+T1/T2), where L is the length of the data segment, T1 is the transmission rate of the preferred communication link, and where T2 is the transmission rate of the alternative communication link. This particular length L" is a balance between the rates or capacities of the preferred and alternative communication links. This balance ensures timely delivery of the fragments, which reduces latency of the overall transport.

According to similar aspects, a length L" of the first fragment is determined as L"=L/(1+C1/C2), where L is the length of the data segment, C1 is the transmission capacity of the preferred communication link, and where C2 is the transmission capacity of the alternative communication link.

The fragments lengths need not be adapted to current transmission conditions. Some aspects of the disclosure comprise use of a fixed or configurable fragment size. This particular aspect is associated with a reduced amount of configuration, which can be an advantage in some cases.

According to some aspects, the preferred communication link is associated with a first transmission cost, and wherein the alternative communication link is associated with a transmission cost lower than the first transmission cost, wherein the preferred communication link not being available for transmission of the data segment within the current time period comprises the first transmission cost exceeding a pre-configured cost threshold. The different links may, e.g., be assigned time variable costs depending on, e.g., system load or energy consumption. In general, it is appreciated that the preferred communication link may be 'preferred' for many different reasons, not just related to transmission rate, capacity, and the like.

As noted above, the method, according to aspects, comprises transmitting St7 the second fragment 210b over the preferred communication link in case the preferred link becomes available within a time period after transmitting the first fragment.

The method is not limited to a single preferred communication link and a single alternative communication link. Rather, a plurality of both preferred and alternative communication links may be considered in the general framework of the disclosed methods. Consequently, according to some aspects, the identifying comprises identifying St31 a plurality of alternative communication links out of the plurality of communication links 120a, 120b, 120c, and fragmenting St41 the data segment into fragments for transmission over at least part of the plurality of alternative communication links.

Figure 4:
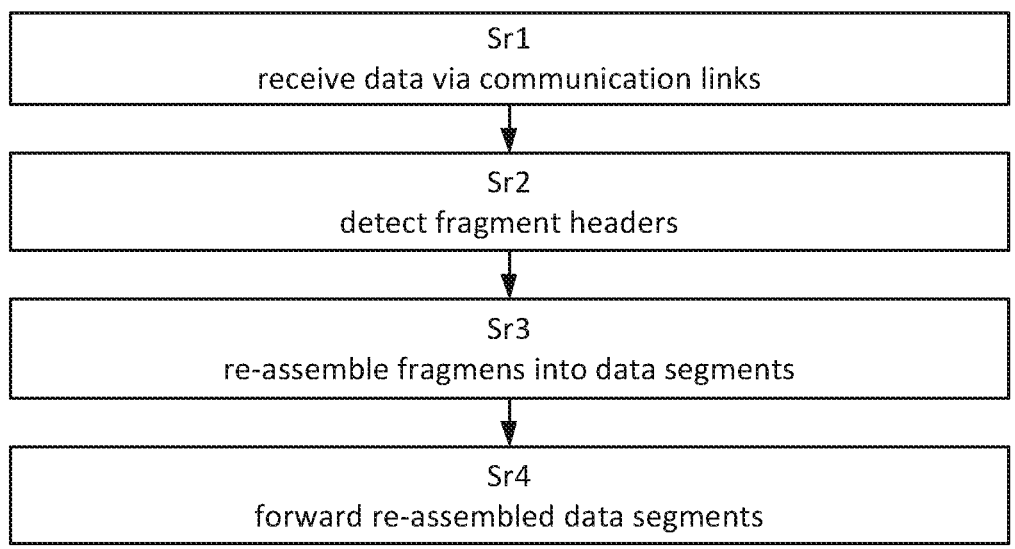

FIG. 4 is a flow chart illustrating methods performed on a receive side of the communication system. There is illustrated a method for link aggregation of a plurality of communication links 120a, 120b, 120c, performed in a communication arrangement 130, 110. The method comprises;

receiving Sr1 data via the plurality of communication links 120a, 120b, 120c, detecting Sr2 fragment headers associated with fragments in the received data, re-assembling Sr3 fragments corresponding to respective data segments, and forwarding Sr4 re-assembled data segments on a port 133, 113 of the communication arrangement 130, 110.

As noted above, the re-assembling is particularly efficient in case a single sequence numbering series is used for both segments and fragments.

Figure 5:
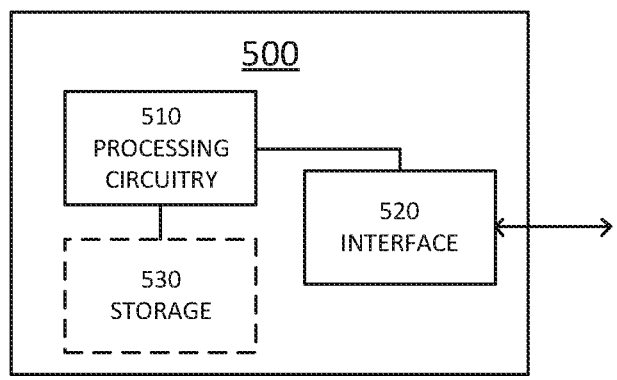
FIG. 5 schematically illustrates a traffic handling unit.

FIG. 5 schematically illustrates, in terms of a number of functional units, the components of a traffic handling unit 500, such as the first traffic handling unit 112, or the second traffic handling unit 132, according to an embodiment of the discussions herein. Processing circuitry 510 is provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the traffic handling unit 500 to perform a set of operations, or steps, such as the methods discussed herein. For example, the storage medium 530 may store the set of operations, and the processing circuitry 510 may be configured to retrieve the set of operations from the storage medium 530 to cause the traffic handling unit to perform the set of operations. The set of operations may be provided as a set of executable instructions. Thus, the processing circuitry 510 is thereby arranged to execute methods as herein disclosed.

The storage medium 530 may also comprise persistent storage, which, for example, can be any single one or combination of magnetic memory, optical memory, solid state memory or even remotely mounted memory.

The traffic handling unit 500 may further comprise an interface 520 for communications with at least one external device. As such the interface 520 may comprise one or more transmitters and receivers, comprising analogue and digital components and a suitable number of ports for wireline or wireless communication.

The processing circuitry 510 controls the general operation of the traffic handling unit 500 e.g. by sending data and control signals to the interface 520 and the storage medium 530, by receiving data and reports from the interface 520, and by retrieving data and instructions from the storage medium 530. Other components, as well as the related functionality, of the control node are omitted in order not to obscure the concepts presented herein.

Figure 6:
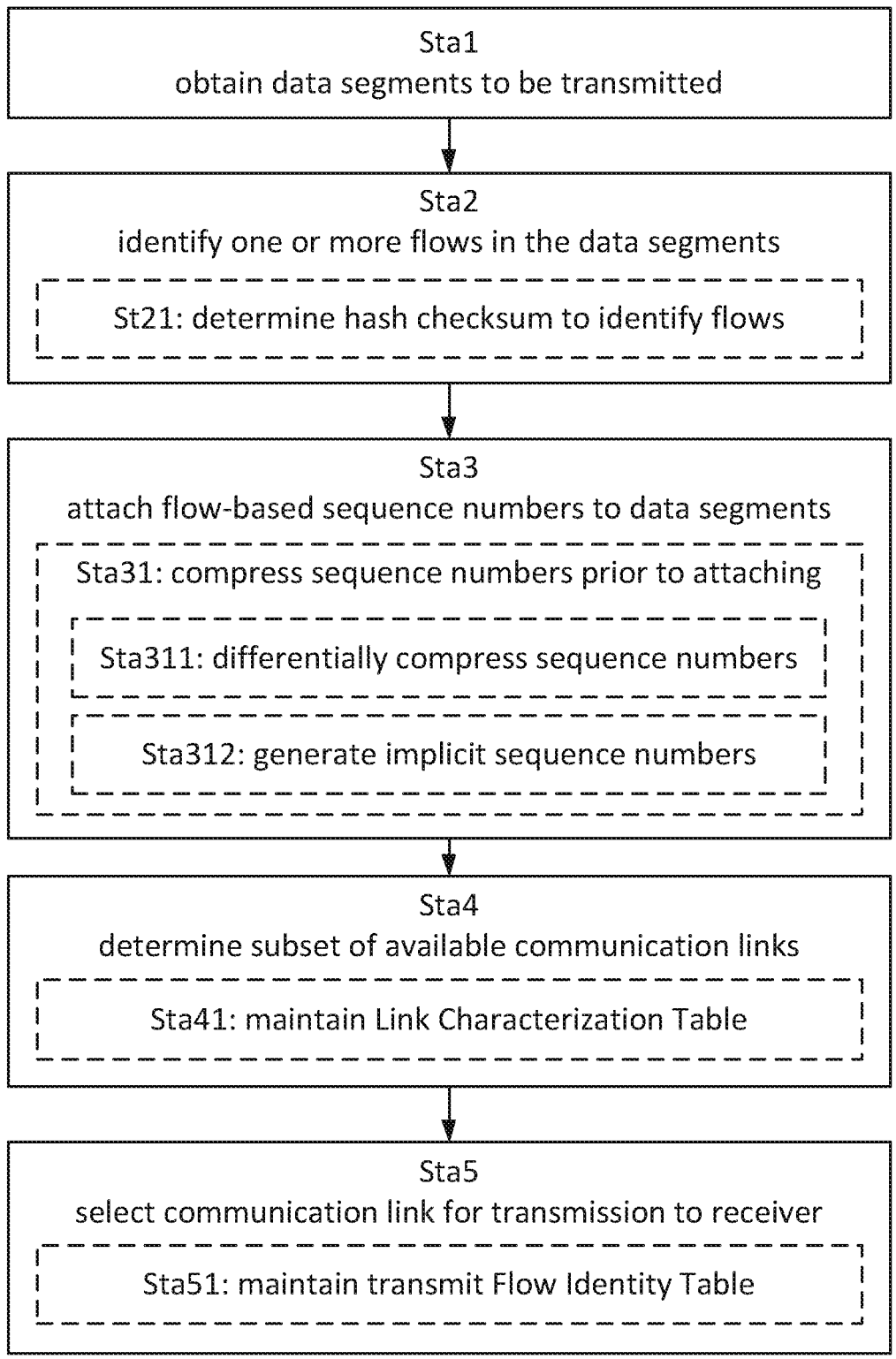
FIGS. 6-7 are flowcharts illustrating methods according to examples of the present disclosure.

FIG. 6 is a flow chart illustrating a transmit side method for link aggregation of a plurality of communication links 120*a*, 120*b*, 120*c*, performed in a communication arrangement 130, 110, based on receive side buffering. The method is illustrated and discussed in connection to FIG. 8.

The method comprises;

obtaining Sta1 data segments 414-417, 419-421, 423-425 to be transmitted, identifying Sta2 one or more data flows 401, 402, 403, 404 in the obtained data segments 414-417, 419-421, 423-425, attaching Sta3 sequence numbers (SEQ) to data segments 414-417, 419-421, 423-425 associated with each identified data flow 401, 402, 403, 404, wherein sequence numbers are independent between data flows, determining Sta4 a subset of available communication links out of the plurality of communication links 120*a*, 120*b*, 120*c*, which subset of available communication links are available for transmission of a data segment within a current time period, and selecting Sta5 a communication link from the subset of available communication links for transmission of a data segment associated with a certain data flow 401, 402, 403, 404, wherein the selecting comprises selecting a previous communication link that has been used for transmission of a previous data segment from said certain data flow 401, 402, 403, 404 in case said previous communication link is comprised in the subset of available communication links, and selecting any communication link comprised in the subset of available communication links otherwise.

Figure 7:
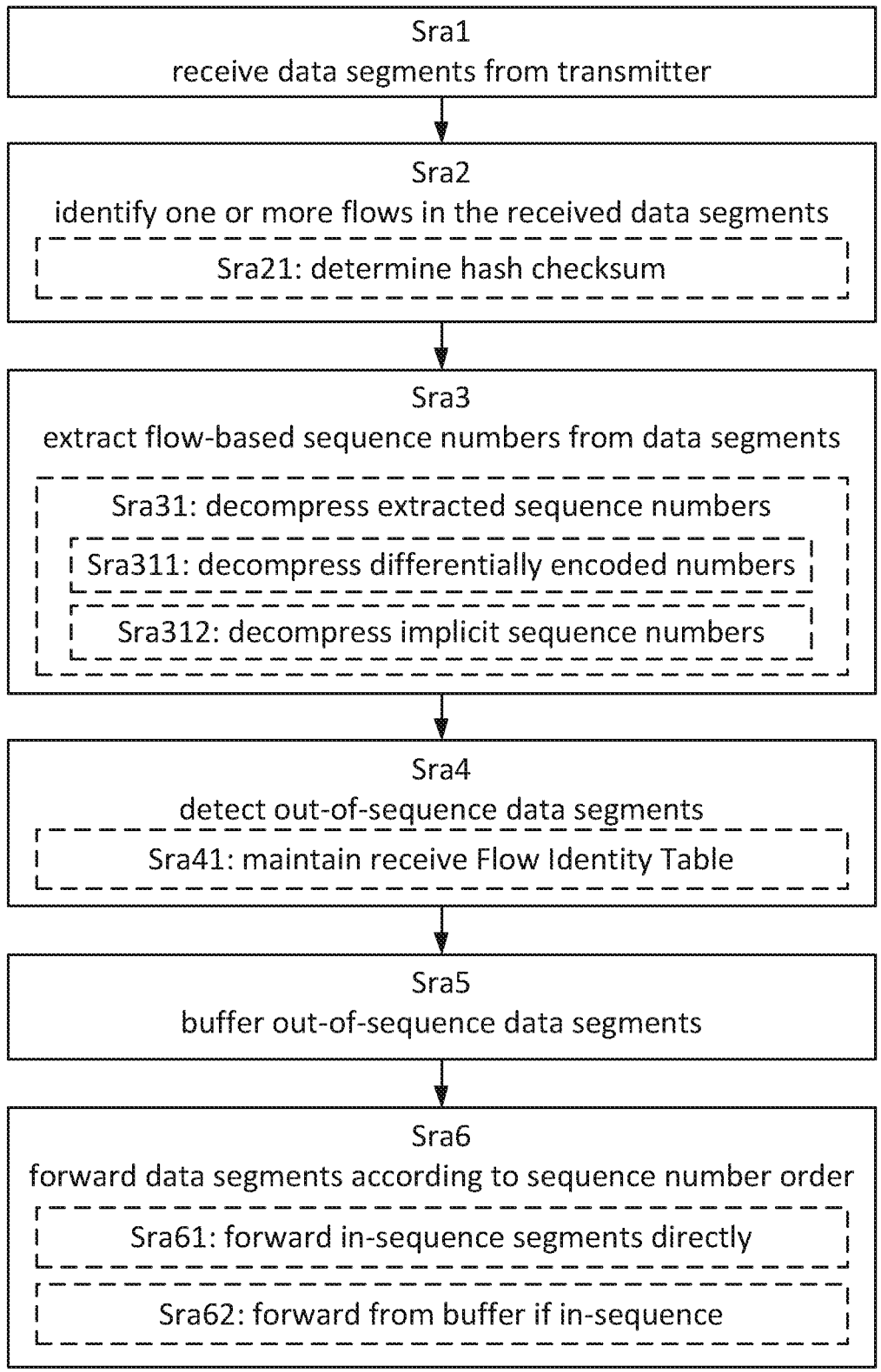

FIG. 7 is a flow chart illustrating a receive side method for link aggregation of a plurality of communication links 120*a*, 120*b*, 120*c*, performed in a communication arrangement 130, 110, based on receive side buffering. The method is illustrated and discussed in connection to FIG. 8.

The method comprises;

receiving Sra1 data segments 414-417, 419-421, 423-425 via the plurality of communication links 120*a*, 120*b*, 120*c*, identifying Sra2 one or more data flows 401, 402, 403, 404 in the received data segments, extracting Sra3 sequence numbers attached to received data segments 414-417, 419-421, 423-425, wherein the sequence numbers are arranged to be independent between data flows, detecting Sra4 data segments received out of sequence 416, 417, 423, by means of the extracted sequence numbers, wherein the sequence numbers indicate an in-sequence order of data segments, buffering Sra5 data segments 416, 417, 423 detected as received out of sequence, and forwarding Sra6 data segments according to sequence number order on a port 133, 113 of the communication arrangement 130, 110.

Figure 8:
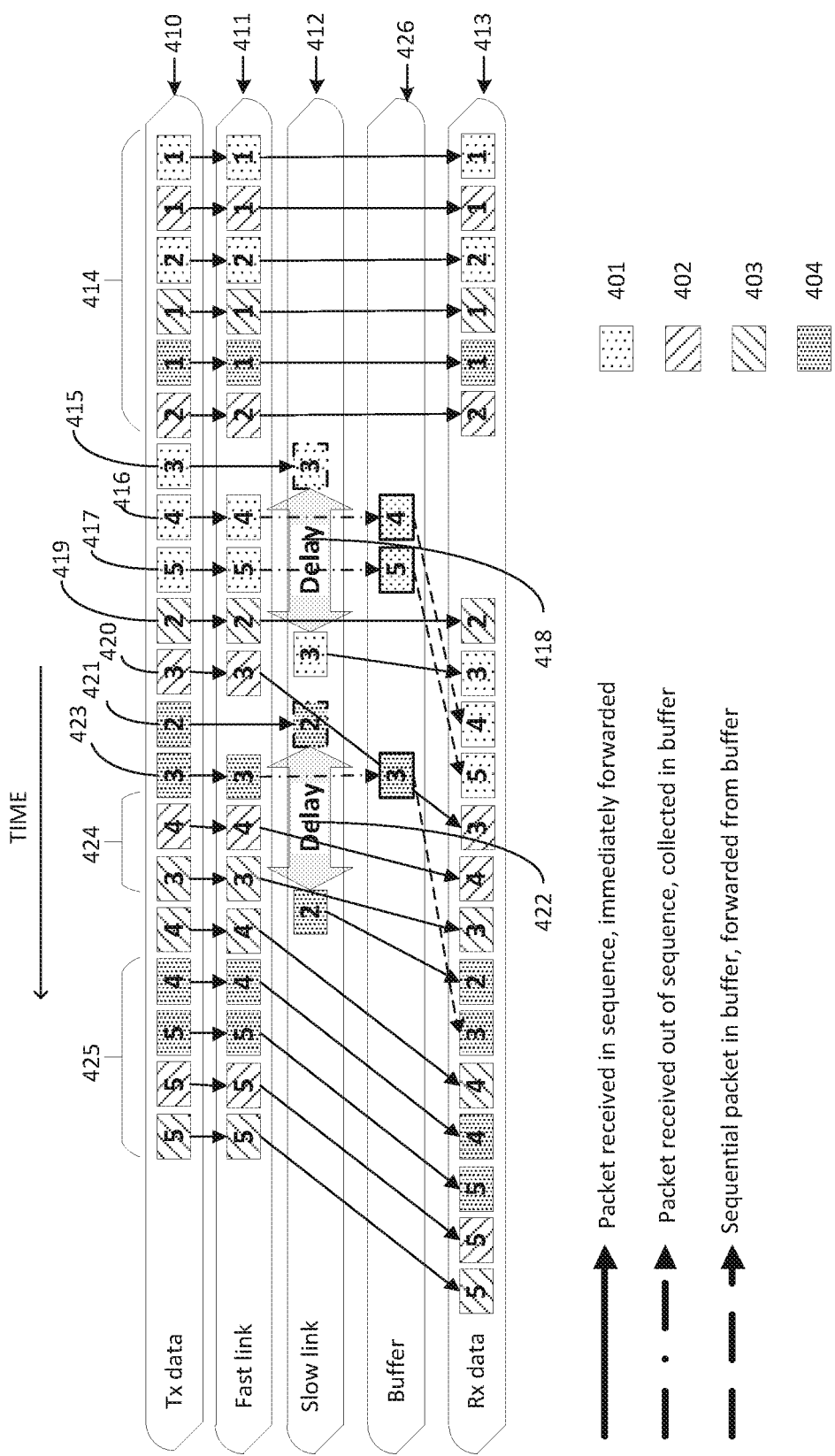
FIG. 8 schematically illustrates transmission and reception of data segments.
Figure 9:
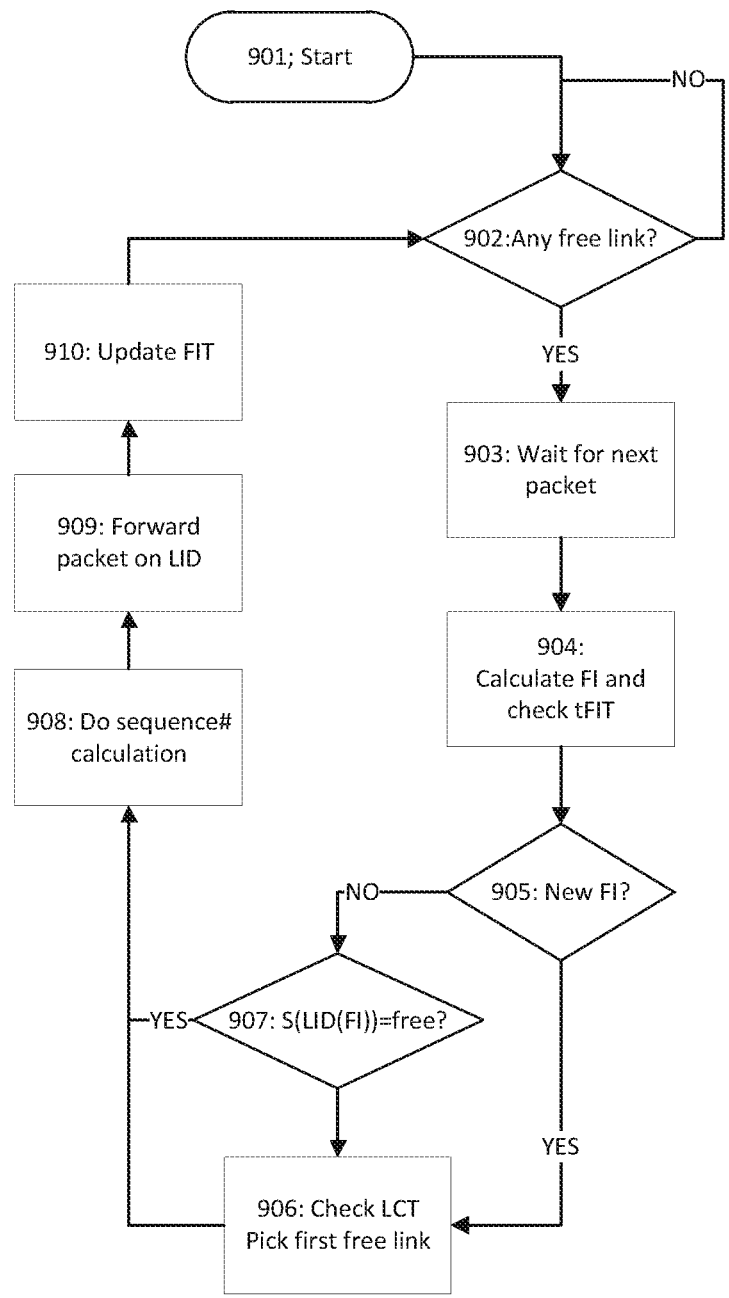
FIGS. 9-11 are flowcharts illustrating methods according to examples of the present disclosure.
Figure 10:
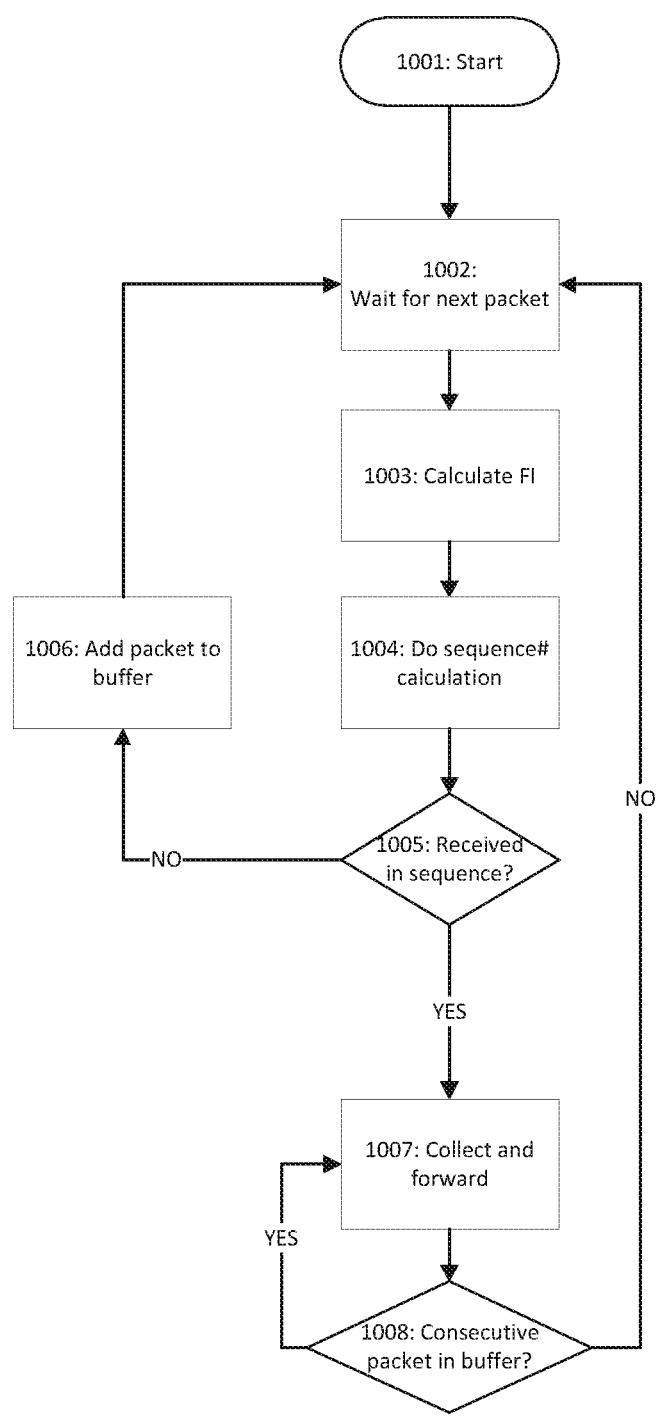

FIGS. 8-10 will be discussed in more detail below.

Figure 11:
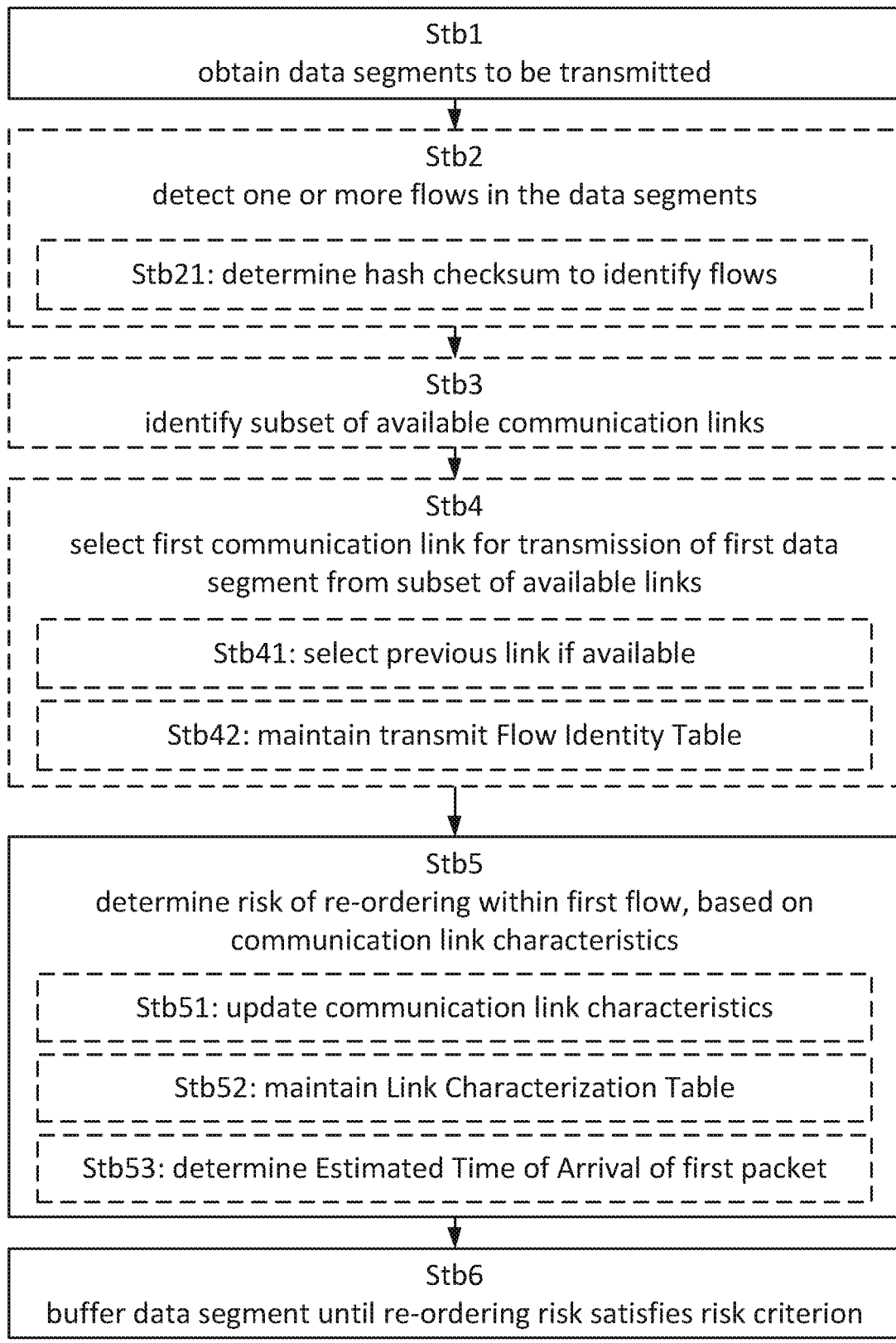

FIG. 11 is a flow chart illustrating a transmit side method for link aggregation of a plurality of communication links 120*a*, 120*b*, 120*c*, performed in a communication arrangement 130, 110, based on transmit side buffering. The method is illustrated and discussed in connection to FIG. 12.

The method comprises;

obtaining Stb1 data segments 1214-1223 to be transmitted, determining Stb5 a risk of re-ordering of data segments within a certain data flow 1201, 1204 comprising a certain data segment 1216, 1217; 1221, where said risk is associated with transmitting said certain data segment via a certain communication link out of the plurality of communication links 120*a*, 120*b*, 120*c*, 120*d*, based on link characteristics associated with the communication links 120*a*, 120*b*, 120*c*, 120*d*, and buffering Stb6 said certain data segment 1216, 1217; 1221 until the risk of re-ordering satisfies a predetermined criterion, prior to transmitting the said certain data segment 1216, 1217; 1221 via the selected communication link.

FIGS. 12-15 will be discussed in more detail below.

Figure 16:
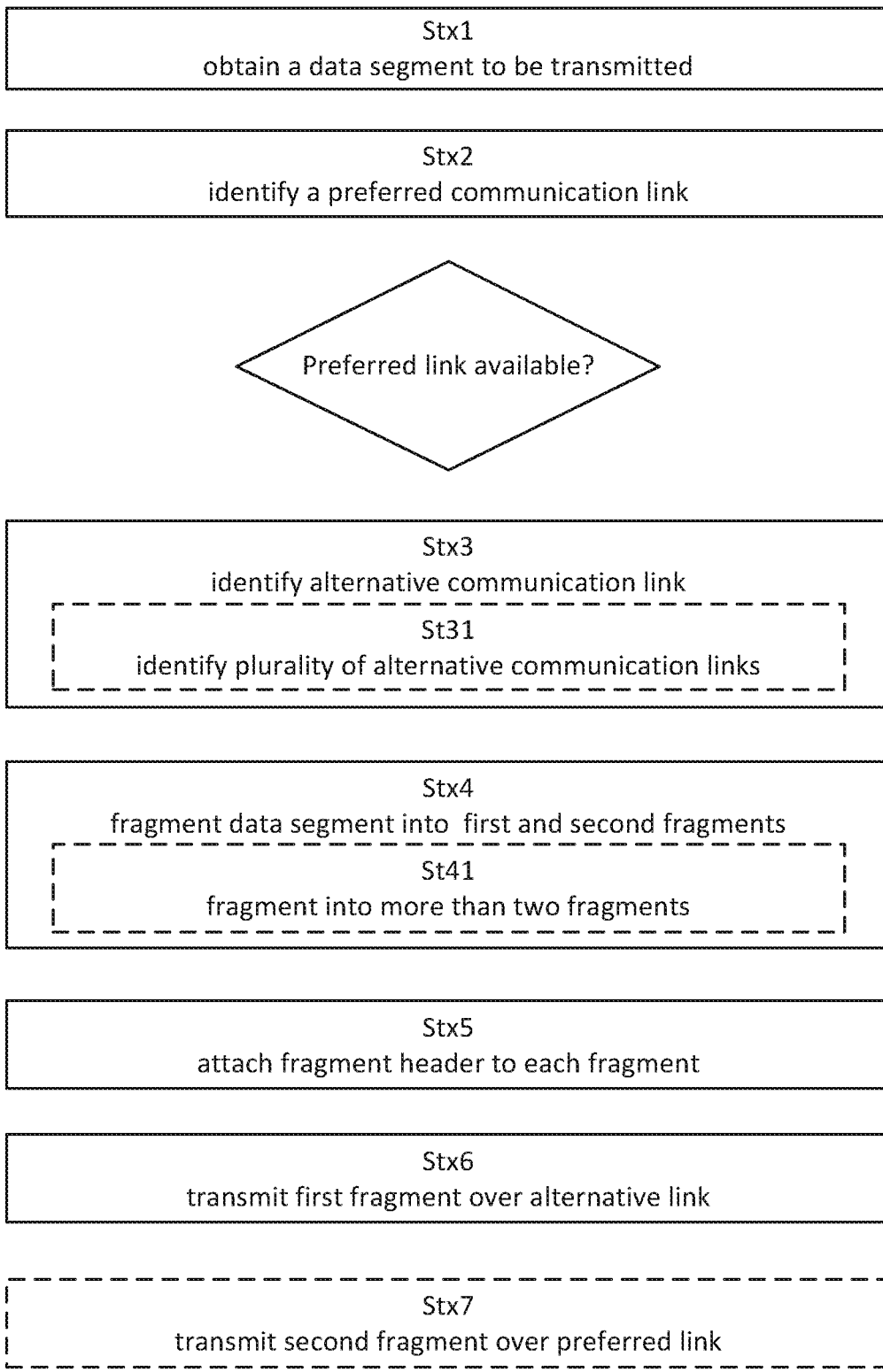
FIGS. 16-17 schematically illustrate traffic handling unit modules.

FIG. 16 schematically illustrates functional modules comprised in a traffic handling unit 500 such as that discussed in connection to FIG. 5. The traffic handling unit 500 is arranged for link aggregation of a plurality of communication links 120*a*, 120*b*, 120*c*, 120*d*, comprising processing circuitry 510, the processing circuitry comprising;

an obtaining module Stx1 configured to obtain a data segment 210 to be transmitted, a first identifying module Stx2 configured to identify a preferred communication link out of the plurality of communication links 120*a*, 120*b*, 120*c* for transmission of the data segment, and, if the preferred communication link is not available for transmission of the data segment within a current time period, identifying, by a second identifying module Stx3, an alternative communication link out of the plurality of communication links 120*a*, 120*b*, 120*c* different from the preferred communication link, the processing circuitry comprising a fragmenting module Stx4 configured to fragment the data segment 210 into at least a first fragment 210*a* and a second fragment 210*b*, an attaching module Stx5 configured to attach a fragment header 220, 230 to each of the first and second fragments, each fragment header being configured to identify the respective fragment as a fragment belonging to a data segment, and a first transmitting module Stx6 configured to transmit the first fragment 210*a* over the alternative communication link.

According to aspects, the second identifying module Stx31 is configured to identify a plurality of alternative communication links out of the plurality of communication links 120*a*, 120*b*, 120*c*, and wherein the fragmenting module Stx41 is configured to fragment the data segment into fragments for transmission over at least part of the plurality of alternative communication links.

According to aspects, the traffic handling unit 500 comprises a second transmitting module Stx7 configured to transmit the second fragment 210b over the preferred communication link in case the preferred link becomes available within a time period after transmitting the first fragment.

Figure 17:
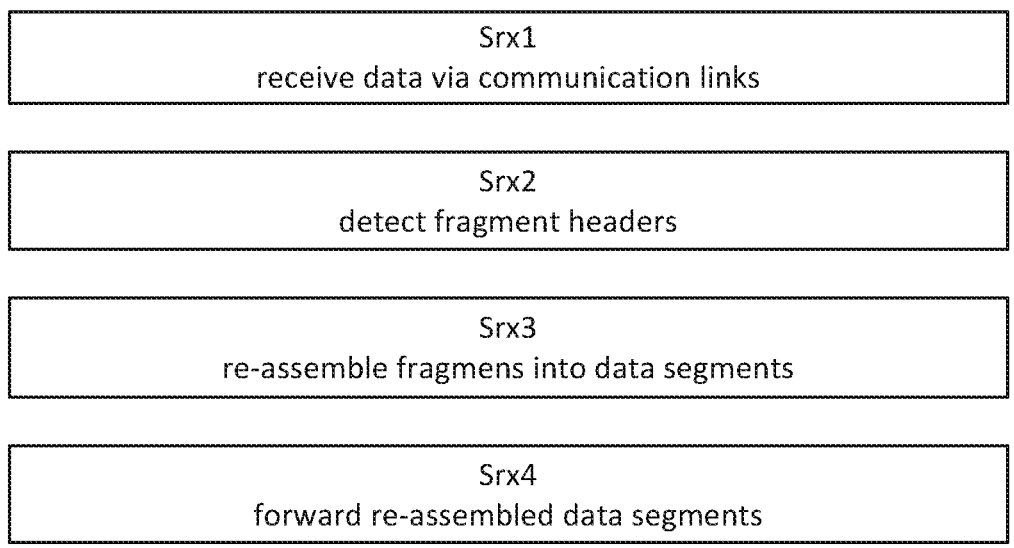

FIG. 17 schematically illustrates another traffic handling unit 500 such as that discussed in connection to FIG. 5. The traffic handling unit 500 is arranged for link aggregation of a plurality of communication links 120a, 120b, 120c, 120d, comprising processing circuitry 510, the processing circuitry here comprises;

a receiving module Srx1 configured to receive data via the plurality of communication links 120a, 120b, 120c, a detecting module Srx2 configured to detect fragment headers associated with fragments in the received data, a re-assembly module Srx3 configured to re-assemble fragments corresponding to respective data segments, and a forwarding module Srx4 configured to forward re-assembled data segments on a port 133, 113 of the communication arrangement 130, 110.

The above-mentioned two different approaches to link aggregation, i.e., receive-side and transmit-side buffering, will now be discussed in detail. Both are applicable together with the methods comprising fragmentation discussed above.

Link Aggregation Comprising Receive Side Buffering

With reference to FIG. 1 and also to FIG. 8, the first communication arrangement 110 is adapted to obtain data segments 414-417, 419-421, 423-425 to be transmitted, then the first traffic handling unit 112 is adapted to identify one or more data flows 401, 402, 403, 404 in the obtained data segments 414-417, 419-421, 423-425, to attach sequence numbers (SEQ) to data segments associated with each identified data flow 401, 402, 403, 404, wherein sequence numbers are independent between data flows, and to calculate a hash checksum for each data segment. The result of this calculation is denominated Flow Identity (FI) and used as entry for a Flow Identity Table (FIT) of arbitrary size; this table is maintained as a transmitting side table (tFIT) as well as a receiving side table (rFIT). The table is then used for identifying the different data flows 401, 402, 403, 404 and is constructed from parsing the data flows, no control plane communication over the link is needed to synchronize the tables. The table contains information for each Flow Identity on what link, Link ID (LID) the last data segment was forwarded and the data flow specific sequence number SEQ and also a last sequence number (SQN) for the latest data segment of a certain data flow that has been forwarded over each communication link 120a, 120b, 120c in the AG 121.

According to the present disclosure, the first communication arrangement 110 is then adapted to select a communication link from the AG 121 associated with a first data flow, wherein the selecting comprises selecting a previous communication link that has been used for transmission of a previous data segment from said certain data flow 401, 402, 403, 404 in case said previous communication link is comprised in the AG 121, and selecting any communication link comprised in the AG 121 otherwise.

This means that data segments are transmitted whenever there is a free link in the AG 121. If the link that the previous data segments with the same FI was transmitted over is free, that one shall be preferred.

The flow specific sequence number SEQ is attached to each data segment before transmission to keep track of delivery order. According to some aspects, to minimize the overhead in transmitted data in connection with this, the compression techniques explained below are used.

The sequence number can according to some aspects be specified in three different ways Complete: The full sequence number is attached and transmitted over link. This is the method used when no knowledge of previous sequence numbers on the receiving side is assumed or as a regular check of consistency.

Differential: The arithmetic difference from the previous sequence number is transmitted. This is in particular beneficial when the difference has a shorter representation then the complete sequence number.

Implicit: The difference in sequence number remain the same between consecutive transmissions. this is in particular beneficial when the sequence number can be unambiguously recreated on the receiving side of the link.

According to some aspects, the first communication arrangement 110 is adapted to first determine subset of available communication links from the AG 121, which subset of available communication links are available for transmission of a data segment within a current time period, and to select a communication link from the subset of available communication links for transmission of a data segment associated with a certain data flow 401, 402, 403, 404. The selecting then comprises selecting a previous communication link that has been used for transmission of a previous data segment from said certain data flow 401, 402, 403, 404 in case said previous communication link is comprised in the subset of available communication links and selecting any communication link comprised in the subset of available communication links otherwise.

According to some aspects, the determining comprises maintaining a Link Characterization Table, LCT, comprising status information associated with each communication link in the plurality of communication links. For example, the status information comprises flow control information indicating if a communication link is available for transmission of a data segment.

At the second communication arrangement 130, in accordance with the present disclosure, link aggregation of the communication links 120a, 120b, 120c is performed. For this purpose, the second communication arrangement 130 is adapted to receive data segments 414-417, 419-421, 423-425 via the communication link 120a, 120b, 120c. The second traffic handling unit 132 is then adapted to identify one or more data flows 401, 402, 403, 404 in the received data segments 414-417, 419-421, 423-425, to extract the flow-specific sequence numbers SEQ, to detect data segments 416, 417, 423 received out of sequence by means of the extracted sequence numbers. The second traffic handling unit 132 is further adapted to buffer data segments 416, 417, 423 detected as received out of sequence, and to forward data segments according to sequence number order on an output port 133 of the second communication arrangement 130.

According to some aspects, the second traffic handling unit 132 is adapted to detect data segments received out of sequence by maintaining the receive Flow Identity Table (rFIT) that comprises said Flow Identities (FI) that are associated with the identified data flows, and corresponding communication link identifiers (LIDs). In accordance with the present example, rFIT comprises the attached sequence number, SQN, of the most recently transmitted data segment associated with each FI. According to some aspects, the rFIT is maintained and updated for each new received data segment.

According to some aspects, the second traffic handling unit 132 is adapted to forward data segments directly when detected as received in sequence, and to forward buffered data segments associated with sequence numbers consecutive to sequence numbers of previously forwarded data segments.

This means that when a data segment is received, the FI is calculated and rFIT is checked for over which communication link 120a, 120b, 120c the previous data segment with the same FI was transmitted and if the current packet is in sequence or not.

In rFIT, information per FI of the latest sequence number and the latest difference received over each link is maintained and updated for each new received data segment in order to support the compression mechanism.

Out of sequence data segments are buffered. For each FI, data segment received in sequence are immediately collected and forwarded, the buffer is then checked for consecutive data segments to collect.

The second traffic handling unit 132 is according to some aspects adapted to identify said data flows by determining a hash checksum for a pre-determined section of each data segment, where each data flow is identified by a corresponding hash checksum.

The second traffic handling unit 132 is according to some aspects adapted to extract the sequence numbers by decompressing the sequence numbers. For example, the decompressing comprises decompressing differentially encoded sequence numbers or decompressing implicitly encoded sequence numbers configured to be unambiguously recreated by the second traffic handling unit 132 out of the plurality of communication links.

A basic functionality of the present disclosure will now be described more in detail with reference to FIG. 1 and FIG. 8. Here there is a first data flow 401 that is shown with sparse dots, a second data flow 402 that is shown with left to right descending stripes, a third data flow 403 is shown with left to right ascending stripes and a fourth data flow 404 is shown with dense dots. In a Tx data layer 410, the different data flows with data segments have been identified and flow-specific sequence numbers SEQ have been attached to each data segment, denoting the order of the data segments for each data flow. Here, there are two communication links available, a first link 411 that is relatively fast and a second link 412 that is relatively slow.

The first six data segments 414 are transferred via the first link 411 and are not buffered but directly forwarded to an Rx data layer 413. The following seventh data segment 415, being comprised in the first data flow 401 and having a SEQ of 3, is transferred via the second link 412. There is a first excess delay 418 before the seventh data segment 415 is forwarded.

A following eighth data segment 416 and ninth data segment 417, both being comprised in the first data flow 401 and having a SEQ of 4 and 5, are transferred via the first link 411. However, due to the first excess delay 418 for the seventh data segment 415, the second traffic handling unit 132 is adapted to buffer the eighth data segment 416 and ninth data segment 417 such that these data segments that all are comprised in the first data flow 401 are forwarded in correct order.

A following tenth data segment 419, comprised in the third data flow 403 and having a SEQ of 2, is transferred via the first link 411. Since the first excess delay 418 has not yet timed out, and the tenth data segment 419 belongs to another data flow than the previous three data segments 415, 416, 417, the tenth data segment 419 is not buffered but directly forwarded to the Rx data layer 413.

A following eleventh data segment 420, comprised in the second data flow 402 and having a SEQ of 3, is transferred via the first link 411. Since the first excess delay 418 has timed out, and the previous three data segments 415, 416, 417 of the first data flow 401 are ready to be forwarded to the Rx data layer 413, the eleventh data segment 420 is forwarded to the Rx data layer 413 thereafter.

A twelfth data segment 421, being comprised in the fourth data flow 404 and having a SEQ of 2, is transferred via the second link 412. There is a second excess delay 422 before the twelfth data segment 421 is forwarded.

A following thirteenth data segment 423, being comprised in the fourth data flow 404 and having a SEQ of 3, is transferred via the first link 411. However, due to the second excess delay 422 for the twelfth data segment 421, the second traffic handling unit 132 is adapted to buffer the thirteenth data segment 423 such that these data segments that are comprised in the fourth data flow 404 are forwarded in correct order.

During the second excess delay 422, two following data segments 424 are transferred via the first link 411 and are not buffered but directly forwarded to the Rx data layer 413.

Then the second excess delay 422 has timed out, and the two data segments 421, 423 of the fourth data flow 404 are forwarded to the Rx data layer 413. The following data segments 425 are transferred via the first link 411 and are not buffered, but directly forwarded to the Rx data layer 413.

According to some aspects, the buffering is performed in a buffering functionality or buffering layer 426 that is comprised in the first communication arrangement 110.

FIG. 9 shows a flow chart of a process according to some aspects at the first communication arrangement 110. After start 901, it is investigated 902 if there are any free links available until there are. Then, a next data segment, or data packet, is awaited 903. For that data segment FI is calculated and tFIT is checked 904. It is investigated 905 if it is a new FI, and if that is the case LCT is checked and a first free link is picked 906. If not, it is investigated if the link via which the last data segment of the flow in question was forwarded is free 907, and if not LCT is checked and a first free link is picked 906.

In any case, in the following, a SEQ calculation is performed 908, the data segment is forwarded on LID 909 and FIT is updated 910.

FIG. 10 shows a flow chart of a process according to some aspects at the second communication arrangement 130. After start 1001, a next data segment, or data packet, is awaited 1002. For that data segment FI is calculated 1003 and SEG is calculated 1004. It is investigated if the data segment is received in sequence order 1005, and if not the data segment is buffered 1006 and a new data segment is awaited 1002. If the data segment is received in sequence order, it is collected and forwarded 1007. It is then investigated if a consecutive data segment is buffered 1008, and if that is the case, it is also collected and forwarded 1007. If not, a new data segment is awaited 1002.

The buffering at the receiving side which in the above is described for the second communication arrangement 130 provides a dynamic allocation where a previous communication link 120a, 120b, 120c is preferred for each data flow. Each data flow will be routed to communication links 120a, 120b, 120c having sufficient capacity for the complete flow. If there are two communication links with relative capacitates 0,2 and 1,0 and two data flows with the relative rates 0,5 and 0,1, these data flows are transferred via the link with the relative capacity 1,0. If a third data flow with the relative rate 0,5 is added, it will be transferred via the link with the relative capacity 1,0, and the data flow with the relative rate 0,1 will be transferred to the communication link with relative capacity 0,2. The data flow with the relative rate 0,1 will thereafter remain at the communication link with relative capacity 0,2.

The sequence numbering for each data flow minimizes buffering since different data flows are handled separately and do not need to be forwarded in order. The compression of sequence numbers, i.e. transmitting only the difference from the last transmission or not attaching a sequence number at all when it can be predicted on the receiver side brings down the communication overhead on the communication link. It is thus possible to forward data segments over any communication link in an aggregation group without reordering within individual flows.

Since data segments can be forwarded on any communication link for any transmission, a steady state pattern will be reached also when the utilization of the aggregation group is high. This is also the case with only one data flow. Also, since every data flow prefer to stay on the same communication link, data flows will be "attracted" to communication links that can sustain the data flow's full capacity need.

Since order only must be maintained within data flows, necessary buffering is less than for Communication link Bonding, especially when there are large discrepancies in rate between the links in an aggregation group. This is accomplished by attaching separate sequence number per data flow.

Generally, the first traffic handling unit 112 is adapted to obtain data segments 414-417, 419-421, 423-425 to be transmitted, to identify one or more data flows 401, 402, 403, 404 in the obtained data segments 414-417, 419-421, 423-425, and to attach sequence numbers (SEQ) to data segments associated with each identified flow 401, 402, 403, 404, wherein sequence numbers are independent between data flows. The first traffic handling unit 112 is further adapted to determine a subset of available communication links out of the plurality of communication links 120a, 120b, 120c, which subset of available communication links are available for transmission of a data segment within a current time period, and to select a communication link from the subset of available communication links for transmission of a data segment associated with a certain data flow 401, 402, 403, 404. The selecting comprises selecting a previous communication link that has been used for transmission of a previous data segment from said certain data flow 401, 402, 403, 404 in case said previous communication link is comprised in the subset of available communication links and selecting any communication link comprised in the subset of available communication links otherwise.

Generally, at the second communication arrangement 130, link aggregation of the communication links 120a, 120b, 120c is performed. For this purpose, the second communication arrangement 130 is adapted to receive data segments 414-417, 419-421, 423-425 via the plurality of communication links 120a, 120b, 120c. The second traffic handling unit 132 is then adapted to identify one or more data flows 401, 402, 403, 404 in the received data segments 414-417, 419-421, 423-425, to extract the flow-specific sequence numbers to detect data segments 416, 417, 423 received out of sequence by means of the extracted sequence numbers. The second traffic handling unit 132 is further adapted to buffer data segments 416, 417, 423 detected as received out of sequence, and to forward data segments according to sequence number order on an output port 133.

With reference to FIG. 6, the present disclosure relates to a method for link aggregation of a plurality of communication links 120a, 120b, 120c, performed in a communication arrangement 110, 130, comprising;

obtaining Sta1 data segments 414-417, 419-421, 423-425 to be transmitted, identifying Sta2 one or more data flows 401, 402, 403, 404 in the obtained data segments 414-417, 419-421, 423-425, attaching Sta3 sequence numbers, SEQ, to data segments 414-417, 419-421, 423-425 associated with each identified data flow 401, 402, 403, 404, wherein sequence numbers are independent between data flows, determining Sta4 a subset of available communication links out of the plurality of communication links 120a, 120b, 120c, which subset of available communication links are available for transmission of a data segment within a current time period, and selecting Sta5 a communication link from the subset of available communication links for transmission of a data segment associated with a certain data flow 401, 402, 403, 404, wherein the selecting comprises selecting a previous communication link that has been used for transmission of a previous data segment from said certain data flow 401, 402, 403, 404 in case said previous communication link is comprised in the subset of available communication links, and selecting any communication link comprised in the subset of available communication links otherwise.

A number of advantages are obtained by means of the methods illustrated in FIG. 6. Mainly, an enhanced configuration of different devices in a communication link communication system as well as an enhanced interface functionality between these devices is obtained.

There is provided an advantage of enabling forwarding of data segments over any link in an aggregation group without reordering within individual data flows. Since data segments can be forwarded on any link for any transmission, a steady state pattern will be reached also for a high utilization of the aggregation group. This is also the case with only one data flow. Since order only must be maintained within data flows, necessary buffering is reduced compared to prior art, especially when there are large discrepancies in rate between the links in an aggregation group.

According to some aspects, the identifying Sta2 comprises determining Sta21 a hash checksum based on a pre-determined section of each data segment, wherein a data flow is identified by a respective hash checksum.

This provides an advantage of uncomplicated identification of the respective data flows.

According to some aspects, the attaching Sta3 comprises compressing Sta31 sequence numbers prior to attaching.

This provides an advantage of reducing the amount of data transferred via the communication links.

According to some aspects, the compressing Sta31 comprises differentially compressing Sta311 attached sequence numbers according to an arithmetic difference between a previous and a current sequence number.

According to some aspects, the compressing Sta31 comprises generating Sta312 an implicit sequence number configured to be unambiguously recreated on the receiving side of a communication link out of the plurality of communication links 120a, 120b, 120c.

According to some aspects, the determining Sta4 comprises maintaining Sta41 a Link Characterization Table, LCT, comprising status information associated with each communication link in the plurality of communication links 120a, 120b, 120c.

This provides an advantage of providing a tool for keeping track of communication link status, for example if there are any available communication links.

According to some aspects, the status information comprises flow control information indicating if a communication link is available for transmission of a data segment.

According to some aspects, the selecting Sta5 comprises maintaining Sta51 a transmit Flow Identity Table, tFIT, comprising Flow Identities, FI, associated with the identified data flows 401, 402, 403, 404, and corresponding communication link identifiers, LID, wherein the LIDs are used for identifying said previous communication link used for transmission of the most recently transmitted data segment associated with each FI out of the plurality of communication links 120a, 120b, 120c.

This provides an advantage of providing a tool for keeping track of the data flows.

According to some aspects, the tFIT comprises the attached sequence number, SQN, of the most recently transmitted data segment associated with each FI.

According to some aspects, the plurality of communication links 120a, 12b, 120c comprises one or more radio communication links, and wherein the communication arrangement 110, 130 comprises a traffic handling unit 112, 132 and a communication link interface 111a, 111b, 111c; 131a, 131b, 131c for each radio communication link.

With reference to FIG. 7, the present disclosure also relates to a method for link aggregation of a plurality of communication links 120a, 120b, 120c, performed in a communication arrangement 130, 110, comprising;

receiving Sra1 data segments 414-417, 419-421, 423-425 via the plurality of communication links 120a, 120b, 120c, identifying Sra2 one or more data flows 401, 402, 403, 404 in the received data segments, extracting Sra3 sequence numbers attached to received data segments 414-417, 419-421, 423-425, wherein the sequence numbers are arranged to be independent between data flows, detecting Sra4 data segments received out of sequence 416, 417, 423, by means of the extracted sequence numbers, wherein the sequence numbers indicate an in-sequence order of data segments, buffering Sra5 data segments 416, 417, 423 detected as received out of sequence, and forwarding Sra6 data segments according to sequence number order on a port 133, 113 of the communication arrangement 130, 110.

According to some aspects, the identifying Sra2 comprises determining Sra21 a hash checksum for a pre-determined section of each data segment, wherein a data flow is identified by a corresponding hash checksum.

According to some aspects, the extracting Sra3 comprises decompressing Sra31 extracted sequence numbers.

According to some aspects, the decompressing Sra31 comprises decompressing Sra311 differentially encoded sequence numbers.

According to some aspects, the decompressing Sra31 comprises decompressing Sra312 implicitly encoded sequence numbers configured to be unambiguously recreated on the receiving side of a communication link 130, 110 out of the plurality of communication links 120a, 120b, 120c.

According to some aspects, the detecting Sra4 comprises maintaining Sra41 a receive Flow Identity Table, rFIT, comprising Flow Identities, FI, associated with the identified data flows 401, 402, 403, 404, and corresponding communication link identifiers, LID, wherein the LIDs are arranged to identify the communication link, out of the plurality of communication links 120a, 120b, 120c, used for transmission of the most recently transmitted data segment associated with each FI.

According to some aspects, the rFIT comprises the attached sequence number, SQN, of the most recently transmitted data segment associated with each FI.

According to some aspects, the rFIT comprises information per FI of the latest sequence number, wherein the rFIT is maintained and updated for each new received data segment.

According to some aspects, the forwarding Sra6 comprises forwarding Sra61 data segments directly when detected as received in sequence.

According to some aspects, the forwarding Sra6 comprises forwarding Sra62 data segments from buffer associated with sequence numbers consecutive to sequence numbers of previously forwarded data segments.

According to some aspects, the plurality of communication links 120a, 120b, 120c comprise one or more communication links 120a, 120b, 120c, and wherein the communication arrangement 110, 130 comprises a traffic handling unit 112, 132 and a communication link interface 111a, 111b, 111c; 131a, 131b, 131c for each communication link 120a, 120b, 120c.

Generally, the present disclosure also relates to a communication arrangement 110, 130 adapted for link aggregation of a plurality of communication links 120a, 12b, 120c, which communication arrangement 110, 130 is adapted to communicate via the plurality of communication links 120a, 120b, 120c and comprises a traffic handling unit 112, 132 which traffic handling unit 112, 132 is adapted to:

obtain data segments 414-417, 419-421, 423-425 to be transmitted, identify one or more data flows 401, 402, 403, 404 in the obtained data segments 414-417, 419-421, 423-425, attach sequence numbers, SEQ, to data segments associated with each identified data flow 401, 402, 403, 404, wherein sequence numbers are independent between data flows, determine a subset of available communication links out of the plurality of communication links 120a, 120b, 120c, which subset of available communication links are available for transmission of a data segment within a current time period, and to select a communication link from the subset of available communication links for transmission of a data segment associated with a certain data flow 401, 402, 403, 404, wherein the selecting comprises selecting a previous communication link that has been used for transmission of a previous data segment from said certain data flow 401, 402, 403, 404 in case said previous communication link is comprised in the subset of available communication links, and selecting any communication link comprised in the subset of available communication links otherwise.

According to some aspects, the traffic handling unit 112, 132 is adapted to identify one or more data flows by determining a hash checksum based on a pre-determined section of each data segment, wherein a data flow is identified by a respective hash checksum.

According to some aspects, the traffic handling unit 112, 132 is adapted to compress sequence numbers prior to attaching sequence numbers.

According to some aspects, the traffic handling unit 112, 132 is adapted to differentially compress attached sequence numbers according to an arithmetic difference between a previous and a current sequence number.

According to some aspects, the traffic handling unit 112, 132 is adapted to generate an implicit sequence number configured to be unambiguously recreated at a receiving communication arrangement 130, 110.

According to some aspects, the traffic handling unit 112, 132 is adapted to determine a subset of available communication links by maintaining a Link Characterization Table, LCT, comprising status information associated with each communication link in the plurality of communication links 120a, 120b, 120c.

According to some aspects, the status information comprises flow control information indicating if a communication link is available for transmission of a data segment.

According to some aspects, the traffic handling unit 112, 132 is adapted to maintain a transmit Flow Identity Table, tFIT, comprising Flow Identities, FI, associated with the identified flows, and corresponding communication link identifiers, LID, wherein the LIDs are arranged to identify said previous communication link used for transmission of the most recently transmitted data segment associated with each FI out of the plurality of communication links 120a, 120b, 120c.

According to some aspects, the tFIT comprises the attached sequence number, SQN, of the most recently transmitted data segment associated with each FI.

The present disclosure also relates to a communication arrangement 130, 110 adapted for link aggregation of a plurality of communication links, which communication arrangement 130, 110 is adapted to communicate via a plurality of communication links 120a, 120b, 120c and comprises a traffic handling unit 132, 122 which traffic handling unit 132, 122 is adapted to:
- receive data segments 414-417, 419-421, 423-425 via the plurality of communication links 120a, 120b, 120c,
- identify one or more data flows 401, 402, 403, 404 in the received data segments 414-417, 419-421, 423-425,
- extract sequence numbers attached to received data segments 414-417, 419-421, 423-425, wherein the sequence numbers are arranged to be independent between data flows,
- detect data segments 416, 417, 423 received out of sequence, by means of the extracted sequence numbers, wherein the sequence numbers indicate an in-sequence order of data segments,
- buffer data segments 416, 417, 423 detected as received out of sequence, and to
- forward data segments according to sequence number order on a port 133, 113 of the communication arrangement 130, 110.

According to some aspects, the traffic handling unit 132, 122 is adapted to identify one or more data flows by determining a hash checksum for a pre-determined section of each data segment, wherein a data flow is identified by a corresponding hash checksum.

According to some aspects, the traffic handling unit 132, 122 is adapted to decompress extracted sequence numbers.

According to some aspects, the traffic handling unit 132, 122 is adapted to decompress differentially encoded sequence numbers.

According to some aspects, the traffic handling unit 132, 122 is adapted to decompress implicitly encoded sequence numbers configured to be unambiguously recreated at the communication arrangement 130, 110.

According to some aspects, the traffic handling unit 132, 122 is adapted to detect data segments received out of sequence by maintaining a receive Flow Identity Table, rFIT, comprising Flow Identities, FI, associated with the identified data flows 401, 402, 403, 404, and corresponding communication link identifiers, LID, wherein the LIDs are arranged to identify the communication link, out of the plurality of communication links 120a, 120b, 120c, used for transmission of the most recently transmitted data segment associated with each FI.

According to some aspects, the rFIT comprises the attached sequence number, SQN, of the most recently transmitted data segment associated with each FI.

According to some aspects, the rFIT comprises information per FI of the latest sequence number, wherein the rFIT is maintained and updated for each new received data segment.

According to some aspects, the traffic handling unit 132, 122 is adapted to forward data segments directly when detected as received in sequence.

According to some aspects, the traffic handling unit 132, 122 is adapted to forward buffered data segments which are associated with sequence numbers consecutive to sequence numbers of previously forwarded data segments.

Link Aggregation Comprising Transmit Side Buffering

Figure 12:
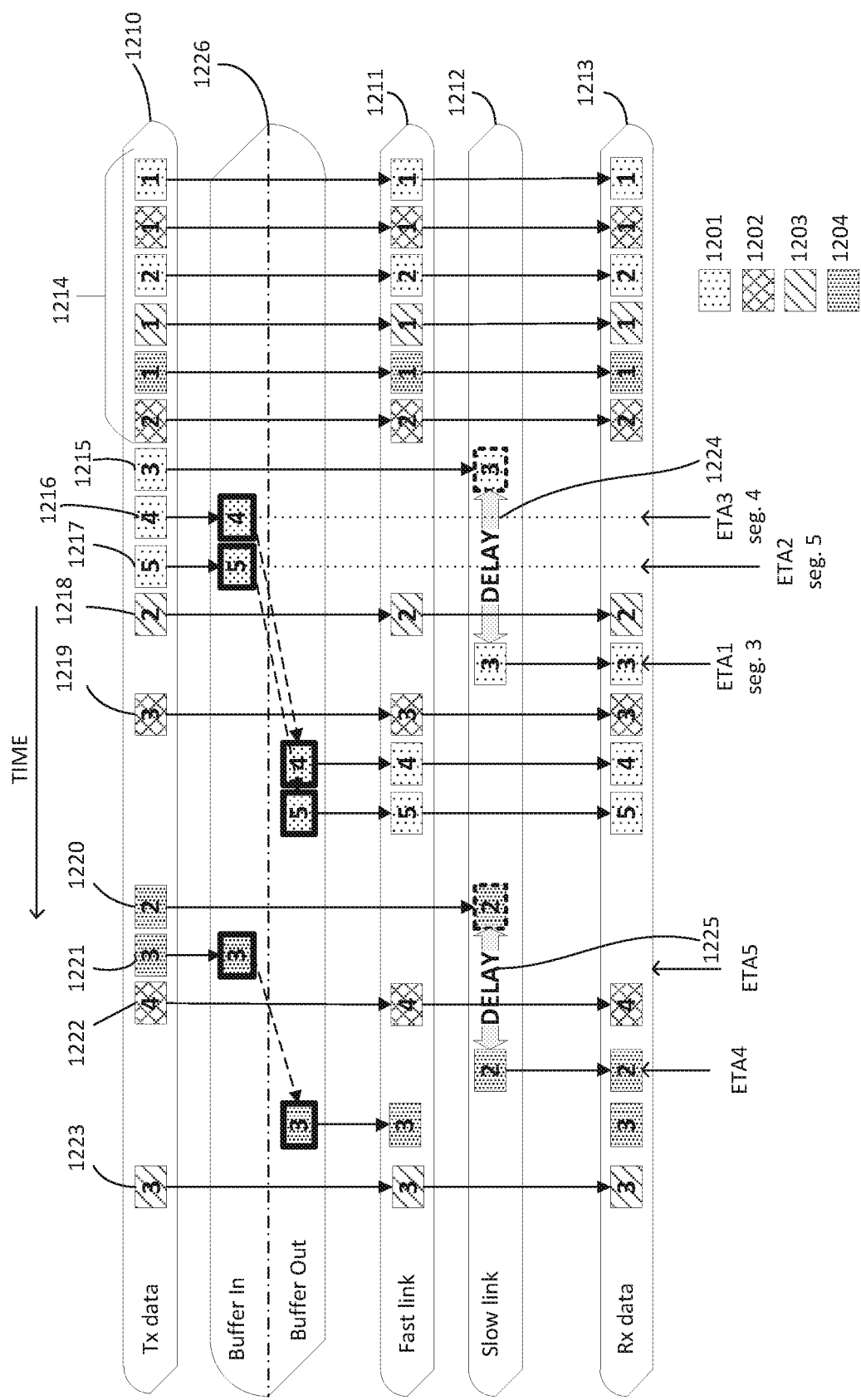
FIG. 12 schematically illustrates transmission and reception of data segments.

With reference to FIG. 1 and also to FIG. 12, the first communication arrangement 110 is adapted to obtain data segments 1214-1223 to be transmitted. According to the present disclosure, the first traffic handling unit 112 is adapted to determine a risk of re-ordering of data segments within a certain data flow 1201, 1204 comprising a certain data segment 1216, 1217, 1221. Said risk is associated with transmitting said certain data segment via a certain communication link out of the plurality of communication links 120a, 120b, 120c, 120d, based on link characteristics associated with the communication links 120a, 120b, 120c, 120d. Examples of link characteristics and a corresponding Link Characterization Table (LCT) will be discussed more in detail later.

The first traffic handling unit 112 is furthermore adapted to buffer said certain data segment 1216, 1217, 1221 until the risk of re-ordering satisfies a predetermined criterion, prior to transmitting the said certain data segment 1216, 1217, 1221 via the selected communication link.

According to some aspects, the traffic handling unit 112, 132 is adapted to detect and identify one or more data flows 1201, 1202, 1203, 1204 in the obtained data segments 1214-1223, to attach sequence numbers (SEQ) to data segments associated with each identified data flow 1201, 1202, 1203, 1204, wherein sequence numbers are independent between data flows, and to calculate a hash checksum for each data segment. Each hash checksum is based on a pre-determined section of each data segment, wherein a flow is identified by a respective hash checksum. The result of this calculation is denominated Flow Identity (FI) and used as entry for a Flow Identity Table (FIT) of arbitrary size; this table is maintained as a transmitting side table (tFIT) as well as a receiving side table (rFIT). The table is then used for identifying the different data flows 1201, 1202, 1203, 1204 and is constructed from parsing the data flows, no control plane communication over the link is needed to synchronize the tables.

The table contains information for each Flow Identity on what link, Link ID (LID) the last data segment was forwarded and the data flow specific sequence number SEQ and also a last sequence number (SQN) for the latest data segment of a certain data flow that has been forwarded over each communication link 120a, 120b, 120c in the AG 121. The rFIT further comprises Delivery Time Stamps, DTS, and Segment Size, SS, values, where the DTS are timestamps indicating when in time the last segment was transmitted, and the SS values indicate the data size of the most recently transmitted data segment of the corresponding flow.

The traffic handling unit 112, 132 is adapted to select said certain communication link by maintaining the tFIT.

In this context, a flow or data flow is a coherent and consecutive flow of data segments. A data flow can according to some aspects correspond to a user streaming a film, a user sending an e-mail or a user having a telephone conversation.

According to some aspects, the traffic handling unit 112, 132 is adapted to identify a subset of available communication links out of the plurality of communication links 120a, 120b, 120c, 120d, which subset of available communication links is available for transmission of a data segment within a current time period, and to select said certain communication link from the subset of available communication links for transmission of said certain data segment 1216, 1217, 1221.

According to some aspects, the traffic handling unit 112, 132 is adapted to select said certain communication link by selecting a communication link used for transmission of a most recently transmitted data segment from said certain data flow 1201, 1204 in case that said communication link is comprised in the subset of available communication links and selecting any communication link comprised in the subset of available communication links otherwise.

A communication link receiver, here the in the form of the second communication arrangement 130, is agnostic of the method applied at the communication link transmitter, here in the form of the first communication arrangement 110. Collection and forwarding of data segments can therefore be performed with maintained compatibility In other words, the second communication arrangement 130, thus acting as a communication link receiver, is adapted to receive data segments 1214-1223 via the plurality of communication links 120a, 120b, 120c, and to forward these data segments 1214-1223 according to receive order on an output port 133. For this purpose, the first communication arrangement 110 and the second communication arrangement 130 are according to some aspects arranged with a common clock functionality. The common clock functionality is used for determining the DTS.

According to some aspects, the traffic handling unit 112, 132 is adapted to determine a risk of re-ordering of data segments by maintaining a Link Characterization Table (LCT) comprising status information associated with each communication link in the plurality of communication links 120a, 120b, 120c. For example, the status information comprises any of Link Latency (LL), Link Capacity (LC) and flow control information indicating if a communication link is available for transmission of a data segment or not. In other words, the link characteristics comprises any of; link latency, link bandwidth, and link throughput. The link characteristics are configured to be either static or dynamic. In the latter case, the traffic handling unit 112 is adapted to determine a risk of re-ordering of data segments by updating link characteristics associated with the selected communication link.

Data segments are transmitted whenever there is a free communication link in the Aggregation Group 121. If the communication link that the previous data segment with the same FI was transmitted over is free, that one shall be preferred. More in detail, when a data segment is received, the FI is calculated and the FIT is checked for over what communication link the previous data segment with the same FI was transmitted. If that communication link is free according to the flow control information, the current data segment is simply forwarded over the same communication link and the FIT entry is updated with DTS and segment size, or packet size, (PS) for the new data segment.

If the communication link is occupied according to the control information, an Estimated Time of Arrival (ETA) is calculated for the previous data segment from existing data in the FIT and LCT. The first traffic handling unit 112 is thus adapted to determine a risk of re-ordering of data segments by determining the ETA associated with a previously transmitted data segment. This will be described more in detail in the following.

The subscript p means that a previous data segment is referred to, the subscript n refers to the specific communication link used for transferring a certain data segment, and the subscript c means that a current data segment is referred to. The Estimated Time of Arrival for a certain previous data segment can be written as:

$$ETA_p = DTS_p + LL_p + PS_p * LC_n$$

After that, a free communication link is selected for the current data segment and ETAc for the current data segment is calculated.

If ETAc>ETAp, the data segment is immediately forwarded on the new communication link. If not, i.e. the current data segment would arrive before the previous one if immediately forwarded, a Buffering Time (BT) is calculated according to $$BT = ETA_p - ETA_c.$$

The FIT entry is then updated with an Estimated DTS (eDTS) and PS for the new data segment according to $$eDTS = CTS + BT + M,$$

where CTS is a Current Time Stamp and M is a margin added to compensate for a possible serialization delay postponing delivery after the Buffering Time BT. A Buffering Timer keeps track of the Target DTS (tDTS) according to $$tDTS = CTS + BT.$$

When the clock reaches tDTS, the data segment is forwarded as soon as the communication link is free, i.e. when the flow control information is indicating that the communication link is available for transmission of a data segment, and the Actual DTS (aDTS) is recorded. A correction factor C is calculated according to $$C = tDTS + M - aDTS.$$

C is then subtracted from all Buffering Timers active for the corresponding FI and from the DTS in the FIT provided it is an eDTS, i.e. located in the future.

Based on having a knowledge of the time it takes to deliver a data segment, a minimal buffering time to avoid reordering is expected, and a data segment must be sent at the earliest after that time, the tDTS. Because of the risk that another flow will occupy the present link at the tDTS, eDTS, which is actually the last time the package can be sent (given prior delivery). aDTS is the actual time the package is sent; the time is used to update tDTS and eDTS for packages in the same flow that are still being buffered. That is, when we buffer multiple packages in the same flow, we need to start from eDTS when calculating ETA for previous packages that have not yet been sent. Once the previous package has been sent and you know aDTS, delivery time for subsequent packages can be updated.

A basic functionality of the present disclosure will now be described more in detail with reference to FIG. 1 and FIG. 12. Here there is a first data flow 1201 that is shown with sparse dots, a second data flow 1202 that is shown with a chequered pattern, a third data flow 1203 is shown with left to right ascending stripes and a fourth data flow 1204 is shown with dense dots. In a Tx data layer 1210, the different data flows with data segments have been identified and flow-specific sequence numbers SEQ have been attached to each data segment, denoting the order of the data segments for each data flow. Here, there are two communication links available, a first link 1211 that is relatively fast and a second link 1212 that is relatively slow.

The first six data segments 1214 are decided to be transferred via the first link 1211, and the first traffic handling unit 112 is adapted to determine corresponding estimated times of arrival for these data segments 1214. Since the order of these data segments 1214 is determined to be the same according to the corresponding estimated times of arrival, the data segments of the different data flows 1201, 1202, 1203, 1204 comprised in these data segments 1214 are determined to be received at the second communication arrangement 130 in correct order. The first traffic handling unit 112 then enables these data segments 1214 to be transmitted via the first link 1211, and they are received at the second communication arrangement 130 and there forwarded to an Rx data layer 1213.

The following seventh data segment 1215, being comprised in the first data flow 1201 and having a SEQ of 3, is decided to be transferred via the second link 1212. There is a first excess delay 1224 before the seventh data segment 1215 is forwarded, and the first traffic handling unit 112 is adapted to determine a first estimated time of arrival ETA1 for the seventh data segment 1215 by estimating the first excess delay 1224. The first traffic handling unit 112 then enables these data segments 1214 to be transmitted via the second link 1212.

The following two data segments 1216, 1217, an eighth data segment 1216 and a ninth data segment 1217, being comprised in the first data flow 1201 and having a corresponding SEQ of 4 and 5, are decided to be transferred via the first link 1211. The first traffic handling unit 112 is adapted to determine a corresponding estimated second time of arrival ETA2 and third time of arrival ETA5 for these data segments 1216, 1217, and to compare these estimated ETA:s with the first estimated time of arrival ETA1. In this case, ETA1>ETA3>ETA2, indicating that the seventh data segment 1215 will be received at the at the second communication arrangement 130 after the eighth data segment 1216 and the ninth data segment 1217, while the eighth data segment 1216 and the ninth data segment 1217 are determined to be received at the second communication arrangement 130 in correct order. This indicates that the order of these received data segments 1215, 1216, 1217 the first data flow 1201 will be incorrect, the seventh data segment 1215 being received at the second communication arrangement 130 after the eighth data segment 1216 and the ninth data segment 1217.

The first traffic handling unit 112 is therefore adapted to buffer the eighth data segment 1216 and the ninth data segment 1217 such that the order of these data segments is determined to be correct when received at the second communication arrangement 130.

After the first excess delay 1224, the seventh data segment 1215 is received at the second communication arrangement 130 and forwarded to the Rx data layer 1213.

Before the eighth data segment 1216 and the ninth data segment 1217 are transferred via the first link 1211, a tenth data segment 1219 being comprised in the second data flow 1202 is decided to be transferred via the first link 1211, and the first traffic handling unit 112 is adapted to determine an estimated time of arrival for this data segment 1214. Since no other previous data segments comprised in the second data flow 1202 are determined to be received at the second communication arrangement 130 after the tenth data segment 1219, the first traffic handling unit 112 enables this data segment 1219 to be transmitted via the first link 1211, and where it is received at the second communication arrangement 130 and forwarded to the Rx data layer 1213.

Thereafter, the eighth data segment 1216 and the ninth data segment 1217 are transferred via the first link 1211, received at the second communication arrangement 130 and forwarded to the Rx data layer 1213. Since the tenth data segment 1219 is comprised in the second data flow 1202, it does not matter that this data segment was received at the second communication arrangement 130 before the eighth data segment 1216 and the ninth data segment 1217, since the order with the data flows is preserved.

Here it is to be noted that the margin M mentioned previously, that is used for postponing delivery after the Buffering Time BT, here is used to compensate for a possibility of a data segment like the tenth data segment 1219 that is transferred before the eighth data segment 1216 and the ninth data segment 1217. Should there not have been a tenth data segment 1219 in this example, an earlier Actual DTS (aDTS) would have been recorded for the eighth data segment 1216, and a corresponding correction factor C would have been calculated and used for the ninth data segment 1217.

A corresponding procedure is repeated for a following eleventh data segment 1220 and twelfth data segment 1221 which both are comprised in the fourth data flow 1204, where the eleventh data segment 1220 is decided to be transferred via the second link 1212 and the twelfth data segment 1221 is decided to be transferred via the first link 1211. There is a second excess delay 1225 before the eleventh data segment 1220 is forwarded, and the first traffic handling unit 112 is adapted to determine a fourth estimated time of arrival ETA4 for the seventh data segment 1215 by estimating the second excess delay 1225.

The first traffic handling unit 112 is adapted to determine an estimated fifth time of arrival ETA5 for the twelfth data segment 1221, and to compare is estimated ETA5 with the fourth estimated time of arrival ETA4. In this case, ETA4>ETA5, indicating that the eleventh data segment 1220 will be received at the at the second communication arrangement 130 after the twelfth data segment 1221. This indicates that the order of these received data segments 1215, 1216, 1217 the first data flow 1201 will be incorrect, the eleventh data segment 1220 being received at the second communication arrangement 130 after the twelfth data segment 1221.

The first traffic handling unit 112 is therefore adapted to buffer the twelfth data segment 1221 such that the order of these data segments 1220, 1221 is determined to be correct when received at the second communication arrangement 130.

Before the eleventh data segment 1220 and the twelfth data segment 1221 are transferred, a thirteenth data segment 1222 being comprised in the second data flow 1202 is decided to be transferred via the first link 1211, and the first traffic handling unit 112 is adapted to determine an estimated time of arrival for this data segment 1222. Since no other previous data segments comprised in the second data flow 1202 are determined to be received at the second communication arrangement 130 after the thirteenth data segment 1222, the first traffic handling unit 112 enables this data segment 1222 to be transmitted via the first link 1211, and where it is received at the second communication arrangement 130 and forwarded to the Rx data layer 1213.

Thereafter, the second excess delay 1225 has timed out and the eleventh data segment 1220 is received at the second communication arrangement 130 and forwarded to the Rx data layer 1213. Then the twelfth data segment 1221 is transferred via the first link 1211, received at the second communication arrangement 130 and forwarded to the Rx data layer 1213.

In FIG. 4, there is a following fourteenth data segment 1223 comprised in the third data flow 1203 that has been decided to be transferred via the first link 1211. The first traffic handling unit 112 enables this data segment 1223 to be transmitted via the first link 1211, and it is received at the second communication arrangement 130 and there forwarded to the Rx data layer 1213. According to some aspects, the sequence numbers are detached from the data segments before transmission and consequently never transmitted. In FIG. 12, the sequence numbers are shown at the links 1211, 1212 and the Rx data layer 1213 for reasons of clarity.

According to some aspects, the buffering is performed in a buffering functionality or buffering layer 1226 that is comprised in the first communication arrangement 110.

Figure 13:
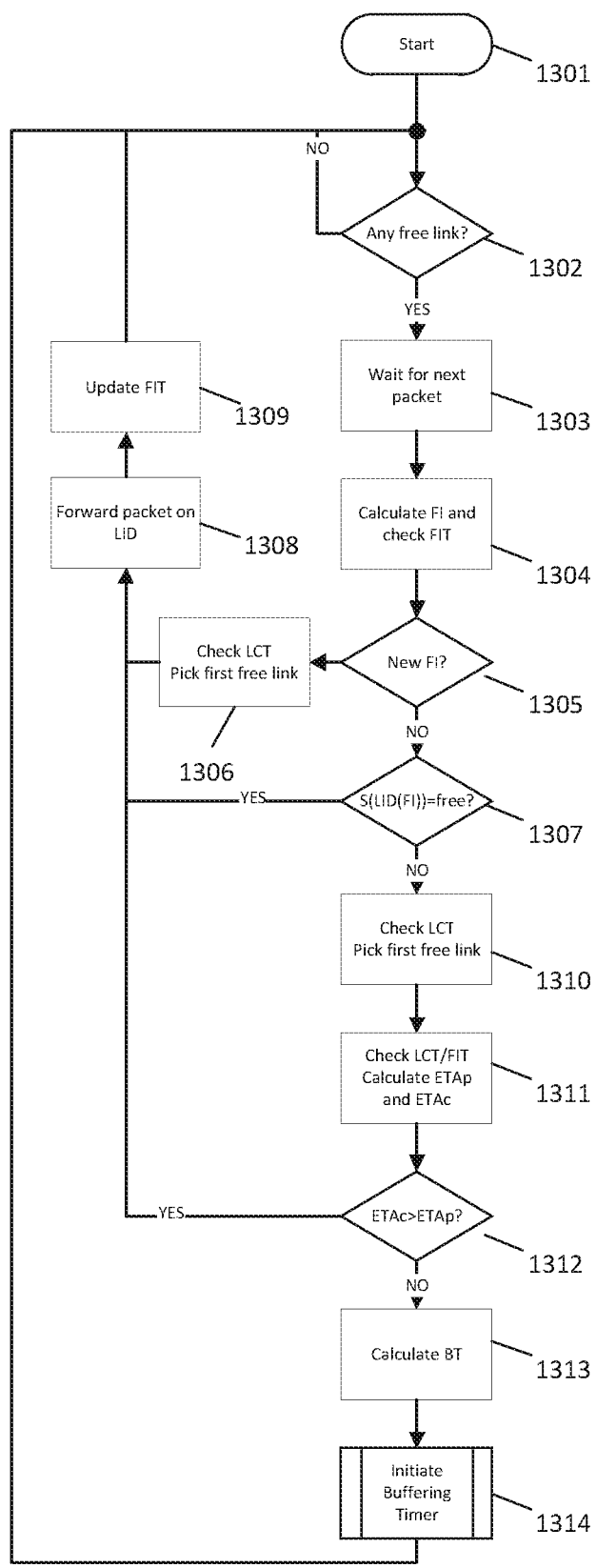
FIGS. 13-15 are flowcharts illustrating methods according to examples of the present disclosure.

FIG. 13 shows a flow chart of a process according to some aspects at the first communication arrangement 110. After start 1301, it is investigated 1302 if there are any free links available until there are. Then, a next data segment, or data packet, is awaited 1303. For that data segment FI is calculated and tFIT is checked 1304. It is investigated 1305 if it is a new FI, and if that is the case LCT is checked and a first free link is picked 1306. If not, it is investigated if the link via which the last data segment of the flow in question was forwarded is free 1307, and that is the case, and also after a first free link is picked 1306, the data segment is forwarded on LID 1308, FIT is updated 1309 and it is again investigated 1302 if there are any free links available until there are.

If the link via which the last data segment of the flow in question was forwarded is not free at the investigation step 1307, LCT is checked and a first free link is picked 1310. Then LCT/FIT is checked and estimated time of arrival for a previous data segment ETCp and a current data segment ETAc are calculated 1311. Then it is investigated 1312 if ETA>ETCp, and if that I the case the package is forwarded on the LID 1308. Otherwise, a buffering time BT is calculated 1313 and a buffering timer is initiated 1314.

Figure 15:
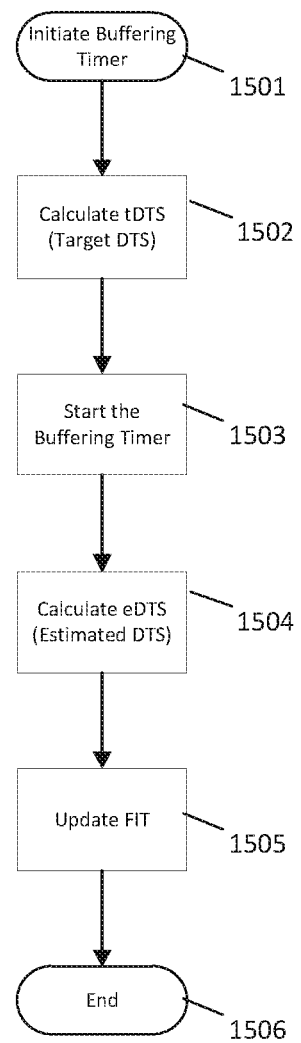

An example of step 1315 is described with reference to FIG. 15. Here, the buffering timer is initiated 1501, a target delivery time stamp DTS is calculated 1502, a buffering timer is started 1503, estimated DTS is calculated 1504, FIT is updated 1505, and the procedure then ends 1506.

Figure 14A:
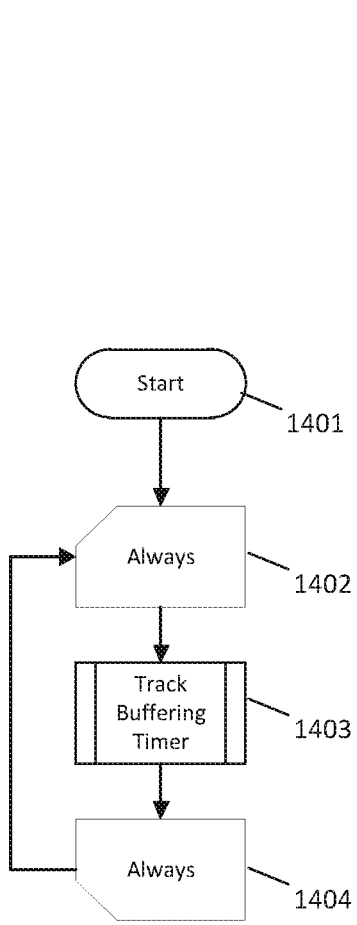

FIG. 14a shows a flow chart of a process according to some aspects at the first communication arrangement 110; here the process is started 1401, always 1402 the buffering timer is tracked 1403, and the process always restarts 1404.

Figure 14B:
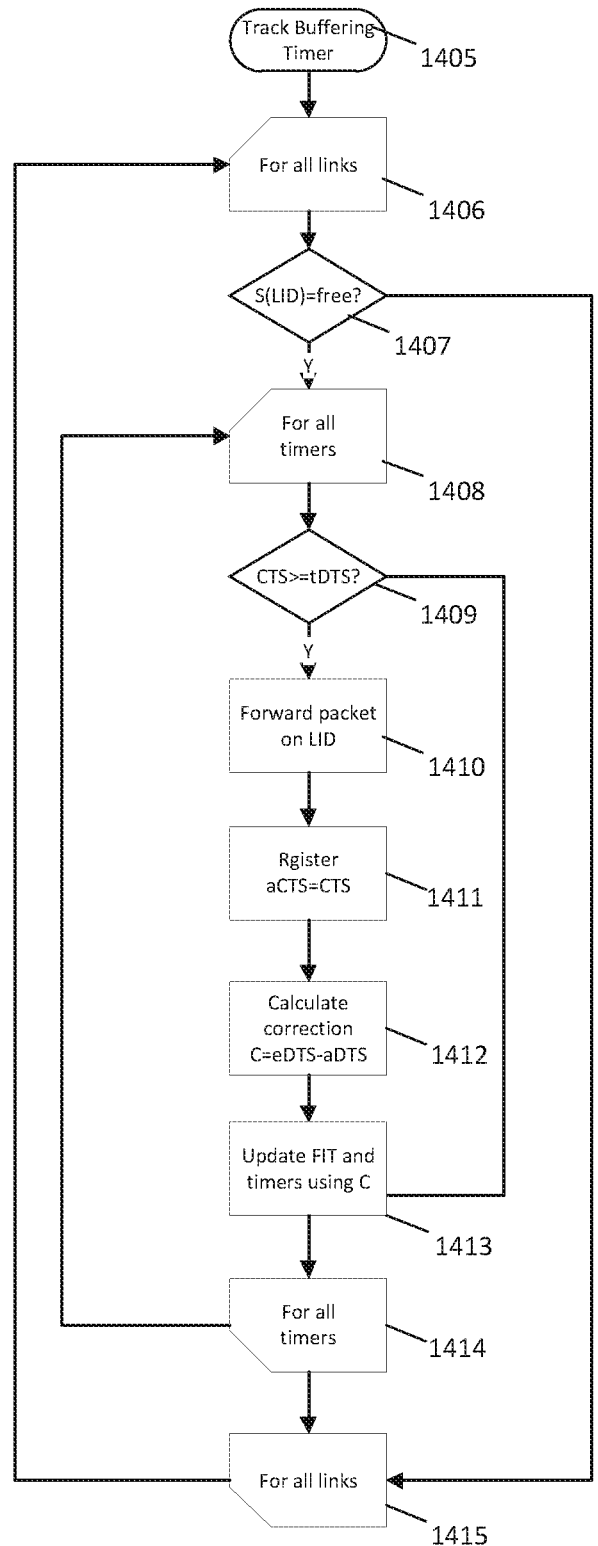

FIG. 14b shows a flow chart of a process according to some aspects at the first communication arrangement 110, more specifically tracking of buffering timer 1405. Packets with postponed delivery time resides in a buffer until delivery. With each packet is a timer and a targeted delivery time (tDTS) associated.

The status of every link in the aggregation group is checked 1406, 1407. For all buffering timers (BT) 1408 associated with the link, provided it's free, it is checked whether current time (CTS) has passed the targeted delivery time (tDTS) 1409. If so, the packet associated with that BT is forwarded in the link 1410. The actual delivery time (aDTS) is then recorded 1411 for the delivered packet and the correction factor (C) is calculated 1412. C is then used to correct BT:s that still are active for the same FI and update 1413 the Flow Identity Table to reflect the correct delivery time for the packet. This is repeated for all timers 1414. Should the link not be free, a loop of checking if the link is free is repeated for all timers 1415 until the link is free.

Enabling buffering of data segments at the transmitting side is an enhanced way of using the communication links, enabling a more effective hashing and also enabling moving data flows between the communication links by keeping track of an ETA and compensating for the ETA when a data flow is moved to a faster communication link.

Since data segments can be forwarded on any communication link for any transmission, a steady state pattern will be reached also when the utilization of the aggregation group is high. This is also the case with only one data flow. Also, since every data flow prefer to stay on the same communication link, data flows will be "attracted" to communication links that can sustain the data flow's full capacity need.

Since order only must be maintained within data flows, necessary buffering is less than for Communication link Bonding, especially when there are large discrepancies in rate between the communication links in an aggregation group. This is accomplished by attaching separate sequence number per data flow.

An estimated time of arrival (ETA) has bend determined in order to estimate an order of received data segments. Generally, the traffic handling unit 112, 132 is adapted to determine a risk of re-ordering of data segments within a certain data flow. Such risk can for example be derived from an ETA.

The Flow Identity (FI), the Flow Identity Table (FIT) and its components are optional.

With reference to FIG. 11, the present disclosure relates to method for link aggregation of a plurality of communication links 120a, 120b, 120c, 120d comprised in an Aggregation Group, AG, performed in a communication arrangement 110, 130, comprising;

obtaining Stb1 data segments 1214-1223 to be transmitted, determining Stb5 a risk of re-ordering of data segments within a certain data flow 1201, 1204 comprising a certain data segment 1216, 1217, 1221, where said risk is associated with transmitting said certain data segment via a certain communication link out of the plurality of communication links 120a, 120b, 120c, 120d, based on link characteristics associated with the communication links 120a, 120b, 120c, 120d, and buffering Stb6 said certain data segment 1216, 1217; 1221 until the risk of re-ordering satisfies a predetermined criterion, prior to transmitting the said certain data segment 1216, 1217; 1221 via the selected communication link.

A number of advantages are obtained by means of methods illustrated in FIG. 11. Mainly, an enhanced configuration of different devices in a communication link communication system as well as an enhanced interface functionality between these devices is obtained. It is furthermore possible to forward data segments over any link in an aggregation group without reordering within individual flows.

A further advantage is insensitivity to data rate of individual data flows and the capacity offered by individual links without introducing excessive buffering.

A further advantage lies in the possibility to forward data segments over any link in an aggregation group without reordering within individual data flows.

A communication link receiver is agnostic to the present disclosure being applied at a communication link transmitter. Collection and forwarding of data segments can therefore be performed with maintained compatibility.

Since data segments can be forwarded on any communication link for any transmission, a steady state pattern will be reached also for a high utilization of the aggregation group for also a rather limited number of flows.

Since order only must be maintained within flows, necessary buffering is reduced compared to prior art, especially when there are large discrepancies in rate between the communication links in an aggregation group.

According to some aspects, the method comprises detecting Stb2 one or more data flows 1201, 1202, 1203, 1204 in the obtained data segments 1214-1223.

According to some aspects, the detecting Stb2 comprises determining Stb21 a hash checksum based on a pre-determined section of each data segment, wherein a flow is identified by a respective hash checksum.

According to some aspects, the method comprises identifying Stb3 a subset of available communication links out of the plurality of communication links 120a, 120b, 120c, 120d, which subset of available communication links is available for transmission of a data segment within a current time period and selecting Stb4 said certain communication link from the subset of available communication links for transmission of said certain data segment 1216, 1217, 1221.

According to some aspects, the selecting Stb4 comprises selecting Stb41 a communication link used for transmission of a most recently transmitted data segment from said certain data flow 1201, 1204 in case that said communication link is comprised in the subset of available communication links and selecting any communication link comprised in the subset of available communication links otherwise.

According to some aspects, the selecting Stb4 comprises maintaining Stb42 a transmit Flow Identity Table, tFIT, comprising Flow Identities, FI, associated with the identified flows 401, 402, 403, 404, corresponding communication link identifiers, LID, Delivery Time Stamps, DTS, and Segment Size values, SS, wherein the LIDs are used for identifying said previous communication link used for transmission of the most recently transmitted data segment associated with each FI out of the plurality of communication links 120a, 120b, 120c, the DTS are time-stamps indicating when in time the last segment was transmitted, and the SS values indicate the data size of the most recently transmitted data segment of the corresponding flow.

This provides an advantage of providing a tool for keeping track of the data flows.

According to some aspects, the DTS value is determined based on a common clock, wherein all communication links are arranged to receive the common clock.

This provides an advantage of providing reliable and consistent DTS values.

According to some aspects, the link characteristics comprises any of; link latency, link bandwidth, and link throughput.

According to some aspects, the link characteristics are configured to be static.

According to some aspects, the link characteristics are dynamic, and wherein the determining Stb5 comprises updating Stb51 link characteristics associated with the selected communication link.

According to some aspects, the determining Stb5 comprises maintaining Stb52 a Link Characterization Table, LCT, comprising status information associated with each communication link in the plurality of communication links 120a, 120b, 120c.

This provides an advantage of providing a tool for keeping track of communication link status.

According to some aspects, the status information comprises any of Link Latency, LL, Link Capacity, LC, and flow control information indicating if a communication link is available for transmission of a data segment.

This provides an advantage of providing a tool for keeping track of if there are any available communication links.

According to some aspects, the determining Stb5 comprises determining Stb53 an Estimated Time of Arrival, ETA, associated with a previously transmitted data segment.

This provides an advantage of reducing the buffering time to what is determined to be necessary.

According to some aspects, the plurality of communication links 120a, 12b, 120c comprises one or more communication links 120a, 120b, 120c, and wherein the communication arrangement 110, 130 comprises a traffic handling unit 112, 132 and a communication link interface 111a, 111b, 111c; 131a, 131b, 131c for each communication link 120a, 120b, 120c.

Generally, the present disclosure relates to a communication arrangement 110, 130 adapted for link aggregation of a plurality of communication links 120a, 12b, 120c, comprised in an Aggregation Group, AG, 121, which communication arrangement 110, 130 is adapted to communicate via the plurality of communication links 120a, 120b, 120c and comprises a traffic handling unit 112, 132, which traffic handling unit 112, 132 is adapted to:

obtain data segments 1214-1223 to be transmitted, determine a risk of re-ordering of data segments within a certain data flow 1201, 1204 comprising a certain data segment 1216, 1217; 1221, where said risk is associated with transmitting said certain data segment via a certain communication link out of the plurality of communication links 120a, 120b, 120c, 120d, based on link characteristics associated with the communication links 120a, 120b, 120c, 120d, and to buffer said certain data segment 416, 417; 421 until the risk of re-ordering satisfies a predetermined criterion, prior to transmitting the said certain data segment 416, 417; 421 via the selected communication link.

According to some aspects, the traffic handling unit 112, 132 is adapted to detect one or more data flows 1201, 1202, 1203, 1204 in the obtained data segments 1214-1223.

According to some aspects, the traffic handling unit 112, 132 is adapted to detect said one or more data flows 1201, 1202, 1203, 1204 by determining a hash checksum based on a pre-determined section of each data segment, wherein a flow is identified by a respective hash checksum.

According to some aspects, the traffic handling unit 112, 132 is adapted to identify a subset of available communication links out of the plurality of communication links 120a, 120b, 120c, 120d, which subset of available communication links is available for transmission of a data segment within a current time period, and to select said certain communication link from the subset of available communication links for transmission of said certain data segment 1216, 1217; 1221.

According to some aspects, the traffic handling unit 112, 132 is adapted to select said certain communication link by selecting a communication link used for transmission of a most recently transmitted data segment from said certain data flow 1201, 1204 in case that said communication link is comprised in the subset of available communication links and selecting any communication link comprised in the subset of available communication links otherwise.

According to some aspects, the traffic handling unit 112, 132 is adapted to select said certain communication link by maintaining a transmit Flow Identity Table, tFIT, comprising Flow Identities, FI, associated with the identified flows 1201, 1202, 1203, 1204, corresponding communication link identifiers, LID, Delivery Time Stamps, DTS, and Segment Size values, SS, wherein the LIDs are used for identifying said previous communication link used for transmission of the most recently transmitted data segment associated with each FI out of the plurality of communication links 120a, 120b, 120c, the DTS are time-stamps indicating when in time the last segment was transmitted, and the SS values indicate the data size of the most recently transmitted data segment of the corresponding flow.

According to some aspects, the DTS value is determined based on a common clock, wherein all communication links are arranged to receive the common clock.

According to some aspects, the link characteristics comprises any of; link latency, link bandwidth, and link throughput.

According to some aspects, the link characteristics are configured to be static.

According to some aspects, the link characteristics are dynamic, and wherein the traffic handling unit 112, 132 is adapted to determine a risk of re-ordering of data segments by updating link characteristics associated with the selected communication link.

According to some aspects, the traffic handling unit 112, 132 is adapted to determine a risk of re-ordering of data segments by maintaining a Link Characterization Table, LCT, comprising status information associated with each communication link in the plurality of communication links 120a, 120b, 120c.

According to some aspects, the status information comprises any of Link Latency, LL, Link Capacity, LC, and flow control information indicating if a communication link is available for transmission of a data segment.

According to some aspects, the traffic handling unit 112, 132 is adapted to determine a risk of re-ordering of data segments by determining an Estimated Time of Arrival, ETA, associated with a previously transmitted data segment.

According to some aspects, the plurality of communication links 120a, 12b, 120c comprises one or more communication links 120a, 120b, 120c, and wherein the communication arrangement 110, 130 comprises a communication link interface 111a, 111b, 111c; 131a, 131b, 131c for each communication link 120a, 120b, 120c.

According to some aspects, the preferred communication link not being available for transmission of the data segment within the current time period does not mean that the preferred communication link is faulty or malfunctioning. Instead, this is according to some aspects due to the fact that the preferred communication link is not preferred within the current time period. This is in turn according to some aspects due to the fact that the preferred communication link is associated with a congestion condition, and/or that the preferred communication link is associated with a traffic load condition exceeding a pre-configured high traffic load threshold. Alternatively. according to some aspects, the preferred communication link is associated with a first transmission cost, and an alternative communication link is associated with a transmission cost lower than the first transmission cost where the first transmission cost exceeds a pre-configured cost threshold.

The invention claimed is:

1. A method for link aggregation of a plurality of communication links, performed in a communication arrangement, the method comprising;
    obtaining a data segment to be transmitted,
    identifying a preferred communication link out of the plurality of communication links for transmission of the data segment;
    determining that the preferred communication link is not available for transmission of the data segment within a current time period; and
    in response to determining that the preferred communication link is not available for transmission of the data segment within the current time period:
        identifying an alternative communication link out of the plurality of communication links different from the preferred communication link,
        fragmenting the data segment into at least a first fragment and a second fragment,
        attaching a fragment header to each of the first and second fragments, each fragment header being configured to identify the respective fragment as a fragment belonging to a data segment, and
        transmitting the first fragment over the alternative communication link.

2. The method according to claim 1, wherein the fragment headers comprise sequence numbers from a sequence associated with a flow in which the data segment is comprised.

3. The method according to claim 1, wherein the preferred communication link is associated with a transmission rate T1, and/or a transmission capacity C1, wherein the alternative communication link is associated with a transmission rate T2, and/or a transmission capacity C2, wherein T1 is higher than T2 and/or C1 is higher than C2.

4. The method according to claim 3, wherein a length L" of the first fragment is determined as $L"=L/(1+T1/T2)$, where L is the length of the data segment, T1 is the transmission rate of the preferred communication link, and where T2 is the transmission rate of the alternative communication link.

5. The method according to claim 3, wherein a length L" of the first fragment is determined as $L"=L/(1+C1/C2)$, where L is the length of the data segment, C1 is the transmission capacity of the preferred communication link, and where C2 is the transmission capacity of the alternative communication link.

6. The method according to claim 1, wherein a length L" of the first fragment is configurable and/or fixed.

7. The method according to claim 1, wherein the preferred communication link not being available for transmission of the data segment within the current time period comprises the preferred communication link being associated with a congestion condition.

8. The method according to claim 1, wherein the preferred communication link not being available for transmission of the data segment within the current time period comprises the preferred communication link being associated with a traffic load condition exceeding a pre-configured high traffic load threshold.

9. The method according to claim 1, wherein the preferred communication link is associated with a first transmission cost, and wherein the alternative communication link is associated with a transmission cost lower than the first transmission cost, wherein the preferred communication link not being available for transmission of the data segment within the current time period comprises the first transmission cost exceeding a pre-configured cost threshold.

10. The method according to claim 1, comprising transmitting the second fragment over the preferred communication link in case the preferred link becomes available within a time period after transmitting the first fragment.

11. The method according to claim 1, wherein the identifying comprises identifying a plurality of alternative communication links out of the plurality of communication links, and fragmenting the data segment into fragments for transmission over at least part of the plurality of alternative communication links.

12. A traffic handling unit arranged for link aggregation of a plurality of communication links, comprising processing circuitry, the processing circuitry comprising:
   an obtaining module configured to obtain a data segment to be transmitted,
   a first identifying module configured to identify a preferred communication link out of the plurality of communication links for transmission of the data segment and configured to determine that the preferred communication link is not available for transmission of the data segment within a current time period,
   a second identifying module configured to identify, responsive to the first identifying module determining that the preferred communication link is not available for transmission of the data segment within the current time period, an alternative communication link out of the plurality of communication links different from the preferred communication link, the processing circuitry further comprising:
   a fragmenting module configured to fragment the data segment into at least a first fragment and a second fragment,
   an attaching module configured to attach a fragment header to each of the first and second fragments, each fragment header being configured to identify the respective fragment as a fragment belonging to a data segment, and
   a first transmitting module configured to transmit the first fragment over the alternative communication link.

13. The traffic handling unit according to claim 12, wherein the second identifying module is configured to identify a plurality of alternative communication links out of the plurality of communication links, and wherein the fragmenting module is configured to fragment the data segment into fragments for transmission over at least part of the plurality of alternative communication links.

14. The traffic handling unit according to claim 12, comprising a second transmitting module configured to transmit the second fragment over the preferred communication link in case the preferred link becomes available within a time period after transmitting the first fragment.

15. A radio link communication system comprising a traffic handling unit according to claim 12 and a second traffic handling unit, wherein the traffic handling unit and the second traffic handling unit are arranged to communicate with each other via communication links.

* * * * *

UNITED STATES PATENT AND TRADEMARK OFFICE
CERTIFICATE OF CORRECTION

PATENT NO. : 11,516,695 B2
APPLICATION NO. : 16/964138
DATED : November 29, 2022
INVENTOR(S) : Thorsén et al.

It is certified that error appears in the above-identified patent and that said Letters Patent is hereby corrected as shown below:

In the Drawings

In Fig. 4, Sheet 4 of 16, for Tag "Sr3", in Line 1, delete "fragmens" and insert -- fragments --, therefor.

In Fig. 9, Sheet 8 of 16, for Tag "901", in Line 1, delete "901; Start" and insert -- 901: Start --, therefor.

In Fig. 14b, Sheet 13 of 16, for Tag "1411", in Line 1, delete "Rgister" and insert -- Register --, therefor.

In Fig. 17, Sheet 16 of 16, for Tag "Srx3", in Line 1, delete "fragmens" and insert -- fragments --, therefor.

In the Specification

In Column 1, Line 47, delete "example" and insert -- example of --, therefor.

In Column 2, Line 3, delete "Aggregation (LAG)" and insert -- Aggregation Group (LAG) --, therefor.

In Column 2, Line 29, delete "distribution" and insert -- distribution is --, therefor.

In Column 4, Line 60, delete "modules;" and insert -- modules. --, therefor.

In Column 6, Line 52, delete "capacity" and insert -- capacities --, therefor.

In Column 7, Line 55, delete "shorth" and insert -- short --, therefor.

In Column 8, Line 25, delete "120c, 120d," and insert -- 120c, --, therefor.
In Column 12, Line 21, delete "1217;" and insert -- 1217, --, therefor.

Signed and Sealed this
Nineteenth Day of September, 2023

*Katherine Kelly Vidal*

Katherine Kelly Vidal
*Director of the United States Patent and Trademark Office*

CERTIFICATE OF CORRECTION (continued)
U.S. Pat. No. 11,516,695 B2

In Column 12, Line 24, delete "120c, 120d," and insert -- 120c, --, therefor.

In Column 12, Lines 25-26, delete "120c, 120d," and insert -- 120c, --, therefor.

In Column 12, Line 27, delete "1217;" and insert -- 1217, --, therefor.

In Column 12, Line 30, delete "1217;" and insert -- 1217, --, therefor.

In Column 12, Line 36, delete "120c, 120d," and insert -- 120c, --, therefor.

In Column 12, Lines 49-50, delete "comprising" and insert -- comprising; --, therefor.

In Column 13, Line 9, delete "120c, 120d," and insert -- 120c, --, therefor.

In Column 14, Line 2, delete "ways" and insert -- ways: --, therefor.

In Column 14, Line 11, delete "then the" and insert -- than the --, therefor.

In Column 14, Line 14, delete "this" and insert -- This --, therefor.

In Column 16, Line 51, delete "SEG" and insert -- SEQ --, therefor.

In Column 19, Line 25, delete "12b," and insert -- 120b, --, therefor.

In Column 19, Line 63, delete "communication link 130, 110" and insert -- communication arrangement 130, 110 --, therefor.

In Column 20, Line 23, delete "12b," and insert -- 120b, --, therefor.

In Column 20, Line 31, delete "12b," and insert -- 120b, --, therefor.

In Column 22, Line 35, delete "120c, 120d," and insert -- 120c, --, therefor.

In Column 22, Lines 36-37, delete "120c, 120d." and insert -- 120c. --, therefor.

In Column 23, Line 17, delete "120c, 120d," and insert -- 120c, --, therefor.

In Column 23, Line 36, delete "compatibility" and insert -- compatibility. --, therefor.

In Column 25, Line 48, delete "ETA5" and insert -- ETA3 --, therefor.

In Column 25, Line 49, delete "ETA:s" and insert -- ETAs --, therefor.

In Column 25, Line 52, delete "at the at the" and insert -- at the --, therefor.

In Column 26, Line 50, delete "compare is" and insert -- compare its --, therefor.

In Column 26, Line 53, delete "at the at the" and insert -- at the --, therefor.

In Column 27, Line 51, delete "ETCp" and insert -- ETAp --, therefor.

In Column 27, Line 53, delete "ETA>ETCp," and insert -- ETAc>ETAp, --, therefor.

In Column 27, Line 53, delete "that I" and insert -- that is --, therefor.

In Column 28, Line 12, delete "BT:s" and insert -- BTs --, therefor.

In Column 28, Line 47, delete "120c, 120d" and insert -- 120c, --, therefor.

In Column 28, Line 57, delete "120c, 120d," and insert -- 120c, --, therefor.

In Column 28, Lines 58-59, delete "120c, 120d," and insert -- 120c, --, therefor.

In Column 28, Line 60, delete "1217;" and insert -- 1217, --, therefor.

In Column 28, Line 63, delete "1217;" and insert -- 1217, --, therefor.

In Column 29, Lines 31-32, delete "120c, 120d," and insert -- 120c, --, therefor.

In Column 30, Line 27, delete "12b," and insert -- 120b, --, therefor.

In Column 30, Line 35, delete "12b," and insert -- 120b, --, therefor.

In Column 30, Line 44, delete "1217;" and insert -- 1217, --, therefor.

In Column 30, Line 47, delete "120c, 120d," and insert -- 120c, --, therefor.

In Column 30, Lines 48-49, delete "120c, 120d," and insert -- 120c, --, therefor.

In Column 30, Line 50, delete "417;" and insert -- 417, --, therefor.

In Column 30, Line 52, delete "417;" and insert -- 417, --, therefor.

In Column 30, Line 65, delete "120c, 120d," and insert -- 120c, --, therefor.

In Column 31, Line 3, delete "1217;" and insert -- 1217, --, therefor.

In Column 31, Line 54, delete "12b," and insert -- 120b, --, therefor.

In Column 32, Line 3, delete "Alternatively." and insert -- Alternatively, --, therefor.

In the Claims

In Column 32, Line 12, in Claim 1, delete "comprising;" and insert -- comprising: --, therefor.

In Column 32, Line 13, in Claim 1, delete "transmitted," and insert -- transmitted; --, therefor.